United States Patent [19]

Farias et al.

[11] Patent Number: 4,891,806
[45] Date of Patent: Jan. 2, 1990

[54] CONSTELLATION MULTIPLEXED INBAND SECONDARY CHANNEL FOR VOICEBAND MODEM

[75] Inventors: Luis V. Farias, Sunrise; Vadavalli G. Krishnan, Miami Lakes; Chin-Pan Wong, Davie, all of Fla.

[73] Assignee: Racal Data Communications Inc., Sunrise, Fla.

[21] Appl. No.: 98,547

[22] Filed: Sep. 18, 1987

[51] Int. Cl.[4] .......................... H04J 3/12; H04J 3/06; H04L 5/12; H04L 23/02
[52] U.S. Cl. .................................. 370/110.1; 375/39; 375/106; 370/100.1
[58] Field of Search ...................... 370/20, 110.1, 119, 370/100; 375/13, 39, 106; 371/43

[56] References Cited

U.S. PATENT DOCUMENTS

| | | |
|---|---|---|
| 3,855,533 | 12/1974 | Schueli . |
| 3,943,285 | 3/1976 | Ragsdale et al. . |
| 3,955,141 | 5/1976 | Lyon et al. . |
| 4,206,320 | 6/1980 | Keasler et al. . |
| 4,227,152 | 10/1980 | Godard et al. ........................ 375/13 |
| 4,277,152 | 10/1980 | Godard et al. . |
| 4,347,616 | 8/1982 | Murakami . |
| 4,389,722 | 6/1983 | Hofmeister . |
| 4,509,171 | 4/1985 | Bremer et al. . |
| 4,520,490 | 5/1985 | Wei ....................................... 371/43 |
| 4,525,846 | 6/1985 | Bremer et al. . |
| 4,538,284 | 8/1985 | Lang et al. . |
| 4,586,182 | 4/1986 | Gallager ............................... 371/43 |
| 4,627,077 | 12/1986 | Armstrong . |
| 4,630,287 | 12/1986 | Armstrong . |
| 4,644,537 | 2/1987 | Gitlin et al. . |
| 4,651,320 | 3/1987 | Thapar ................................. 370/119 |
| 4,713,817 | 12/1987 | Wei ....................................... 375/39 |

OTHER PUBLICATIONS

"Short Binary Convolutional Codes with Maximal Free Distance for Rates ⅔ and ¾", Erik Paaske, IEEE Transactions on Information Theory, Sep. 1974.

Primary Examiner—Benedict V. Safourek
Assistant Examiner—Wellington Chin
Attorney, Agent, or Firm—Jerry A. Miller

[57] ABSTRACT

A method of providing an inband secondary channel for a data modem includes encoding the main channel data using a convolutional encoder so that main channel data symbols are selected from a first constellation. The secondary channel data are encoded using a differential encoder and secondary channel data symbols are selected from a second constellation. The transmission of the main channel symbols takes place during 48 frames of a 49 frame master frame. The differentially encoded secondary channel data symbols are transmitted during the remaining frame. The symbols of the secondary channel constellation are selected to have a higher average energy than those of the main channel data so that the secondary channel is easily detected and may be used to obtain frame synchronization for the modem after brief dropouts without having to retrain the modem.

69 Claims, 14 Drawing Sheets

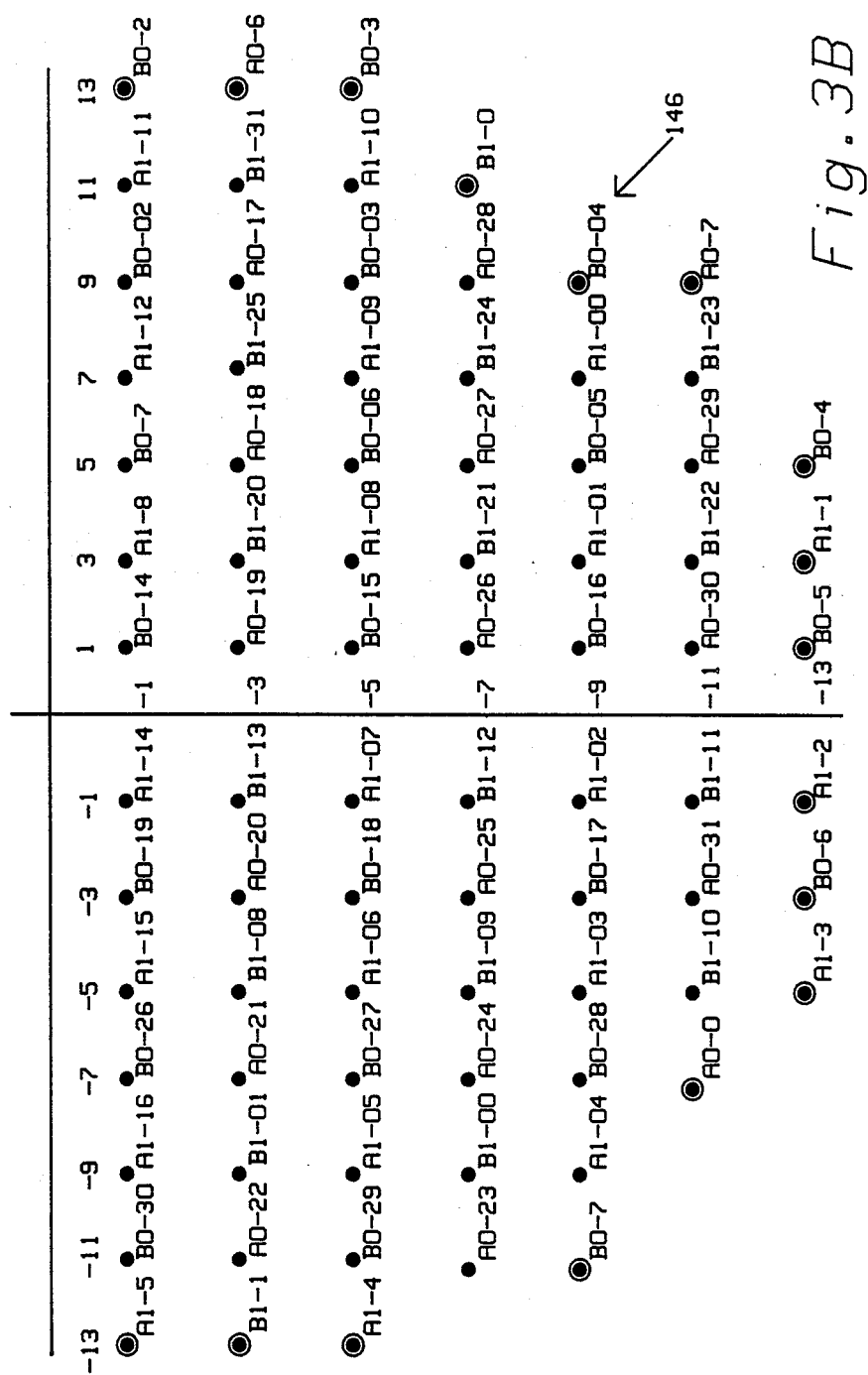

CONSTELLATION MULTIPLEXED INBAND SECONDARY CHANNEL FOR VOICEBAND MODEM

BACKGROUND

1. Field of the Invention

The present invention relates to a method and apparatus for implementing an inband secondary channel in a voiceband modem and using this secondary channel for achieving synchronization in single port and multiport voiceband modems.

2. Background

It is frequently desirable to provide data modems with the capability to communicate over a secondary channel to implement diagnostics and network control functions. U.S. Pat. No. 4,385,384 to Rosbury et al. describes a method and apparatus for implementing an out of band FSK secondary channel by frequency division multiplexing a low speed frequency shift keying channel with the main channel to provide simultaneous communication over the same line as main channel data. Unfortunately, this solution is less practical for very high speed modems operating for example at 19.2 Kbps over voiceband channels. Such high speed modems require virtually all of the bandwidth of the channel and the low speed frequency shift keying transmitter is relatively inefficient in it's use of bandwidth. Also, there is a hardware penalty for using a separate secondary channel transmitter and receiver. The present invention mitigates these problems with an improved arrangement for implementing an inband secondary channel.

Inband techniques have also been used to provide secondary channel capability in data modems. In U.S. Pat. No. 4,627,077 to Armstrong and U.S. Pat. No. 4,630,287 also to Armstrong describe methods for shifting the position of a main channel data symbol in order to encode secondary channel data. A similar technique is disclosed in U.S. Pat. No. 4,644,537 to Gitlin et al. wherein four main channel data symbols are represented by either of two constellation points. One of the two constellation points represents a secondary channel "1" and the other represents a secondary channel "0". These techniques, although using no more bandwidth than the main channel data and providing little main channel degradation, provide a secondary channel which is no more robust (i.e., resistant to errors in the data in the presence of noise and other disturbances) than the main channel. Consequently, if the error performance of the main channel is unacceptable, the secondary channel error performance will also be unacceptable. Thus, some of the diagnostic functions which are desirable to implement in a secondary channel cannot be carried out when line conditions are poor and perhaps when they are needed most.

A similar inband technique is disclosed in U.S. Pat. No. 4,525,846 Bremer et al. In this patent, a secondary channel is implemented by encoding the secondary channel bits by changing the radial distance of the constellation from the origin. This provides a data rate for the secondary channel which apparently is determined by the statistics of the main channel data. In U.S. Pat. No. 4,509,171 also to Bremer et al., a similar radial modulation scheme is used to provide multiport synchronization by detecting the amplitude difference in two main channels. In U.S. Pat. No. 4,389,722 to Hofmeister amplitude modulation is used to facilitate identification of the various channels in a modem transmitting a plurality of data streams. In U.S. Pat. No. 4,347,616 Murakami, frame synchronization bits are added to the signal and modulated with a predetermined detectable amplitude to facilitate multiport synchronization.

In U.S. Pat. No. 4,227,152 to Godard et al., a method of equalizer training is disclosed in which an equalizer is trained only on outer points of a constellation or only in predefined regions of points of the constellation.

SUMMARY OF THE INVENTION

It is an object of the present invention to provide a method and apparatus for providing an inband secondary channel by alternating in predetermined symbol intervals between the use of at least two signal constellations, the primary and secondary channel constellations for transmission of data over the communication channel.

It is another object of the present invention to provide an improved synchronization method for single port and multiport modems.

These and other objects and advantages of the invention will become apparent to those skilled in the art upon consideration of the following description.

In one embodiment of the present invention, an improved method of receiving main and secondary channel data in a data modem includes the steps of receiving a plurality of constellation symbols; determining which of the plurality of constellation symbols are associated with a main channel constellation and which of the data symbols are associated with a secondary channel constellation; processing the main channel constellation symbols according to a method for extracting data from main channel constellation symbols; and processing the secondary channel constellation symbols according to a method for extracting data from secondary channel constellation symbols.

In another embodiment of the present invention, a method for providing synchronization in a data modem includes the steps of: receiving one or more segments of data having length equal to that of a master frame including a designated time period for transmitting secondary channel symbols from a secondary channel constellation; searching the segment for a first time period containing a group of symbols having average energy higher than a predetermined threshold; and synchronizing the data modem receiver by setting the designated time period equal to the first time period.

In another embodiment, an apparatus for transmitting main channel and secondary channel data in a data modem includes a main channel mapper for generating symbols from a main channel constellation corresponding to main channel data. A secondary channel mapper generates symbols from a secondary channel constellation corresponding to secondary channel data. A switch alternately selects main channel and secondary channel symbols in a predetermined arrangement for transmission over a data channel, and a transmitter transmits the selected symbols.

In another embodiment, an apparatus for adjusting characteristics of a data modem having a secondary channel and a main channel, the secondary channel being more immune to noise and other line disturbances than the main channel, the main and secondary channels being transmitted during main and secondary time intervals respectively, include a receiver for receiving signals carrying the main secondary channel. A timing circuit determines when the main and secondary channels respectively are being received. A monitoring circuit monitors the quality of the received signals, and an adjusting circuit adjusts characteristics of the receiver when the signal quality is good and adjusts the characteristics only during the time interval of receipt of the secondary channel when the signal quality is poor.

The present invention provides an improved secondary channel capability by providing a secondary channel constellation separate from the main channel constellation. Symbols for the secondary channel data, which are selected from the secondary channel constellation, are transmitted periodically between symbols for the main channel data, which are selected from the main channel constellation. The invention, in addition to providing a more robust secondary channel which operates well even under significantly degraded line conditions, provides a convenient mechanism for synchronizing the modem receiver.

The first advantage of the invention relates to the superior robustness of the secondary channel relative to the main channel. Whereas the high data rate required of the main channel dictates that the main channel constellation be composed of a large number of closely spaced symbols, the secondary channel constellation has substantially fewer, more distantly spaced points. Hence, the secondary channel constellation has substantially better performance in the face of poor signal to noise ratio than the main channel constellation. Moreover, the detection scheme for such secondary channel can be substantially simpler than that which must be provided for the main channel, which in turn further adds to the robustness of the secondary channel, e.g., less error multiplication.

The second advantage of the present invention is that it provides a simple mechanism for re-synchronization after loss of synchronization, for example from line dropouts, in that selection of symbols from constellations differing by some detectable characteristic, such as average energy, allows for the segregation of the alternating two periods of fixed duration, one period during which symbols from one constellation are transmitted and the other period during which symbols from the other constellation are transmitted.

The third advantage of some embodiments of the present invention is that with good line quality, the main channel and the secondary channel can be used to make adjustments to and adaptions to various components such as equalizer and carrier generator when line quality is good. Whereas, with bad line quality, the secondary channel can make such adjustments and adaptions totally independent of the main channel.

A fourth advantage of the present invention over prior art secondary channels is that the prior art secondary channels often operate over a small range of the available bandwidth. The presence of line problems affecting that range of frequencies can substantially impact communication in the prior art. The present invention is generally very tolerant of such conditions and under most line conditions provides comparable or improved performance over, e.g. FSK out of band secondary channel techniques. Moreover, the present scheme provides a deterministic data rate for the secondary channel data which is totally independent of the main channel.

The fact that the transmission and detection of secondary channel symbols are independent of the transmission and detection of main channel symbols leads to a number of other advantages. Whereas the data rate of the main channel may vary during operation by dropping to lower fallback speeds, such speed variations do not affect the secondary channel which remains at the same data rate independent of the main channel data rate. This in turn leaves unaffected by such speed changes the detection scheme for the secondary channel and the modem synchronization scheme based upon the secondary channel. Moreover, the use of secondary channel symbol constellations with relatively few number of symbols provides the flexibility of being able to expand the secondary channel data rate to larger symbol constellations for next future needs.

The features of the invention believed to be novel are set forth with particularly in the appended claims. The invention itself, however, both as to organization and method of operation, together with further objects and advantages thereof, may be best understood by reference to the following description taken in conjunction with the accompanying drawings.

BRIEF DESCRIPTION OF THE DRAWINGS

FIG. 3B shows the lower two quadrants of the complex plane of the signal constellation of the main channel of the present invention.

DETAILED DESCRIPTION OF THE INVENTION

Figure 1:
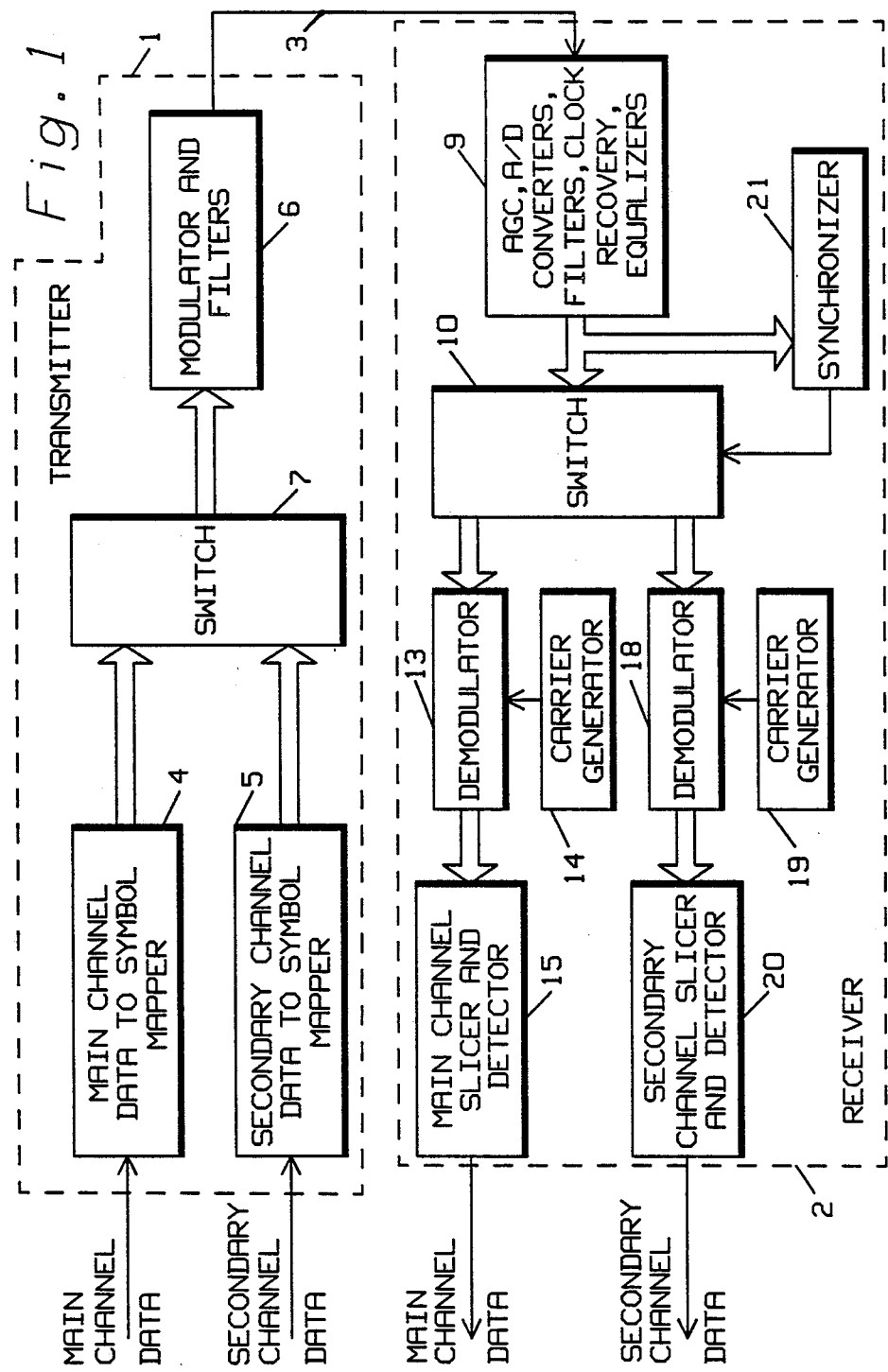
FIG. 1 shows a block diagram of a generalized embodiment of the present invention.

To better understand the present invention, a general overview of this invention is provided in FIG. 1, wherein one of several possible implementations utilizing the present invention, a 19.2K main channel modem, is described in detail thereafter. Referring to FIG. 1, a transmission system is shown wherein a transmitter 1 of a first modem is shown connected to a receiver 2 of a second modem via a bandlimited transmission line 3. Although not shown, each of the modems 1 and 2 preferably have the same transmitter and receiver structures and functionality, i.e., each modem can transmit as well as receive. The transmitter 1 receives main channel binary data, which are typically customer data, and secondary channel binary data, which are data that must undergo more reliable transmission with less errors than the main channel data. In the preferred embodiment, this secondary channel data includes information for controlling, testing, monitoring, configuring the modems, the network and other components of the network. Examples of such information can be found in U.S. Pat. No. 4,385,384 to Rosbury et al, which is incorporated by reference herein. However, it is contemplated that secondary data can be any sensitive data needing lower error rates than the main channel data, e.g., where different streams of customer data are to be transmitted, one stream may need the above described special treatment. Normally, although not necessarily, the main channel data are transmitted at a much greater speed, i.e., bits per second (bps), than the secondary channel data. For example, where the main channel has 19.2K bps, secondary channel for network management as described above, may be only 75 bps.

The main channel data are received by a main channel data to symbol mapper 4, which includes conventional transmitter components, such as a scrambler; differential encoder; symbol generator; and, in systems using convolutional encoding, a convolutional encoder. The secondary channel data are received by a secondary channel data to symbol mapper 5 which also includes the normal and conventional elements of a standard modem, such as those in mapper 4 above. However, the present invention uses two mappers which alternate in transmitting data from different channels. The mappers 4 and 5 provide for the binary data to be encoded as 2-dimensional symbols (which are selected from a symbol constellation of 2-dimensional symbols, i.e., complex valued symbols) for transmission each symbol interval, i.e., baud period or modulation period. As with a conventional modem, a modulator and bandpass filters 6 are provided so that the selected symbol modulates a carrier each symbol interval and is transmitted over the transmission line 3. However, to accommodate the two mappers of the present invention accessing a single modulator 6, a switch 7 is provided to periodically switch from one mapper 4 or 5 to the other mapper 5 or 4. For two channels, this switching occurs at least twice within each of a plurality of repetitive cycles, so that each channel is guaranteed a predetermined number of symbol intervals within each given cycle for transmission. In other words, during each cycle there will be transmissions from each channel during time periods of predetermined and fixed durations. For example, the secondary channel data may have access to the modulator 6 for a four symbol intervals, followed by the main channel having access to the modulator 6 for 192 symbol intervals.

In summary, with respect to access times for two channels, the modulator 6 will be called on to modulate its carrier with symbols from different symbol constellations, with the switch 7 alternately selecting at least one symbol during a first time period of the cycle from a first constellation and then selecting at least one symbol during a second time period of the cycle. Each time period is of a predetermined fixed duration which is a multiple number of symbol intervals, depending upon the number of symbols selected for inclusion in each time period. Where the secondary channel data comprises network management and control information, the access of the main channel to the modulator 6 will be significantly greater than the access of the secondary channel to the modulator 6.

The mapper 4 for the main channel data selects symbols from a symbol constellation having a larger alphabet, i.e., a relatively larger number of symbols or signal points, than the symbol constellation for the secondary channel; therefore leading to a relatively poorer signal to noise ratio (SNR) inherent with higher speed data transmission. Mapper 5 selects symbols from a constellation having a substantially smaller number of symbols which are more widely spaced; therefore leading to a better signal to noise ratio inherent in lower speed data transmissions, relative to the constellation used by mapper 4.

In most contemplated implementations, the main channel normally not only uses a constellation with a much greater number of points (e.g. more than 5 to 10 times as many points), but also more access, on a time basis, to the modulator 6 than the secondary channel. Both factors work to give the main channel a substantially higher data throughput than the secondary channel. However, it is contemplated that in some applications of the invention, the main channel may even have less access to the modulator 6 than the secondary channel, even though it transmits higher or equal speed data. The access to the modulator and relative constellation size may be varied as desired to achieve a desired relative throughput and relative channel robustness.

As mentioned above, the preferred implementation is for use with a main channel having a high transmission speed and high access time to the modulator 6, with a secondary channel having a low transmission speed and a low access time to the modulator 6. However, there can be three or more channels, with the extra channel or channels with each receiver position including its own demodulation, slicer and detector coupled to switch 10, and each transmitter position including its own data to symbol mapper coupled to switch 7. In this case, the cycle of the switch 7 merely allocates its cycle into a number of the fixed time periods at least equal to the number of channels. For example, assume a three channel configuration: main channel "A", first secondary channel "B" and second secondary channel "C". For switch 7, there can be at least one time period allocated for each channel, e.g., A, B, C. However, it should be understood that it is within the scope of the invention, although not particularly desirable, to allocate within a cycle more than one period to a channel, e.g., C, A, B, C. As contemplated by the invention, regardless of the number of channels, one or more of the channels transmit at more robust transmission speeds (and therefore have symbol constellations of smaller alphabets) than one or more other channels. This leads to a primary advantage of the invention, which is to provide the flexibility of transmitting data from at least one channel with more reliability and with less errors than data from at least one other channel.

In FIG. 1, a receiver 2 is shown as signal extracting device having a number of channels equal to the number of channels in the transmitter. The receiver 2 receives a modulated carrier signal over the transmission line 3 that has a repetitive cycle of carrier signal portions, with each portion having been modulated by symbols from a different mapper. Depending upon the implementation, there are modem receiver components in common, such as the normal automatic gain control (AGC), analog to digital (A/D) converter, bandpass filters, clock recovery and equalizer shown in block 9. There are other normal modem functions which are reproduced in each channel or in some cases do not occur in all channels, thereby defining non-common modem functions. The division between common and non-common components is dependent upon the placement of a switch 10, such switch 10, being synchronized to the carrier signal portions of each cycle to switch the processed received signal in a repetitive manner between the channels. In this manner, the channels obtain a received signal modulated by symbols and by a modulation scheme of a type suited to its individualized components. In FIG. 1, the number of non-common components of the signal extraction means is larger than that of the preferred embodiment for illustrative purposes. Such an embodiment provides the flexibility of adding to the robustness of the secondary channel, for example, by providing its own carrier recovery. In particular, the main channel includes a demodulator 13; carrier generator 14; and main channel slicer and detector 15; all of which may be of conventional and well-known designs. The secondary channel includes a demodulator 18; a carrier generator 19; and a secondary channel slicer and detector 20, all of which may be of conventional and well-known design. In general, the components comprising each channel after switch 10 may comprise any one of many well-known designs for extracting the digital data from received signals of generated by the type of modulation and speed of transmission used in the transmitter 1.

However, depending on the objectives of the modem designer, the switch also may be located after the demodulator function. In this case the similar components can be merged into a single component. Additionally, as it is well known in the art, the order of the components themselves can often be changed. All such combinations are intended to be covered by the present invention.

In the preferred arrangement of FIG. 1, when line quality is good, the demodulator and equalizer preferably, but not necessarily, are updated during both the main and secondary channel data by values derived by the processing of the respective signals. However, in times of bad line quality, the secondary channel alone is used to update these components.

During an initial training sequence, switch 10 in the receiver is synchronized with switch 7 in the transmitter so that appropriate carrier signal portions are allocated to the correct receiver channels. However, the use of different signal portions of the present invention allows for another aspect of the present invention, the capability of detecting and correcting for lost synchronization, such as commonly occurs during line dropouts. Generally, this aspect of the invention uses a sliding window, which detects symbols or symbol intervals of higher or lower average energy so as to indicate which carrier signal portions should be allocated to which channel. In other words, the time periods allocated to different symbol constellations are detected. Also, in the case wherein the mapper 4 includes a multi-dimensional convolutional encoder, the 2-dimensional symbols are grouped into frames to define a multidimensional symbol extending over a number of symbol intervals. Once synchronization is lost, a reference point for each such frame must be detected. Likewise, in applications where the mapper 4 accepts a plurality of main channel data streams and multiplexes them on a time division basis using a multiplexer (not shown), it is necessary to determine a reference point for a masterframe. In the case of two channels, a sliding window is passed over the data and the relative energy of the two symbol constellation are detected to distinguish between the two channels. Either periods of high energy are detected (preferred approach) or periods of low energy are detected.

Prior to a detailed description of the present implementation, a brief discussion of the terms "coding", "coder", "encoding" and the like is in order. In the modem arts, the above terms have taken on meanings which may be somewhat confusing if their context is not considered. In the modem arts the above terms primarily relate to "redundancy coding" in which redundant information is added to the data prior to transmission to improve various characteristics of the transmitted data (for example, a convolutional encoder added redundancy). In particular, error performance in the presence of imperfect line conditions is enhanced by "redundancy coding". However, other processes are also frequently referred to by the above terms and strictly speaking are also proper uses of the terms, since in each case, information is taken in one form and "coded" into another form. For example, the process of representing symbols of data by the relative phase shift between adjacent symbols is often referred to as "differential coding". While certainly a type of coding has taken place, no redundancy has been added. The use of these and related terms will be used freely herein and it is believed clear from the context which type of coding is being discussed. Where there appears to be any doubt, clarifying language will be used. In other instances, both types of "coding" may be generally referred to. The terms, in general, may be used to describe either or both types of coding, redundant and non-redundant.

Also by way of definition of terminology, the term "channel" as used herein will have two meanings which may be derived from context. When referring to the communication media itself, the term generally may be interchanged with transmission line for the preferred embodiment. In the case of the use in the sense of "main and secondary channel", the term generally refers to logical channels set up to provide separate communication channels over the same communication media.

Figures 2, 4:
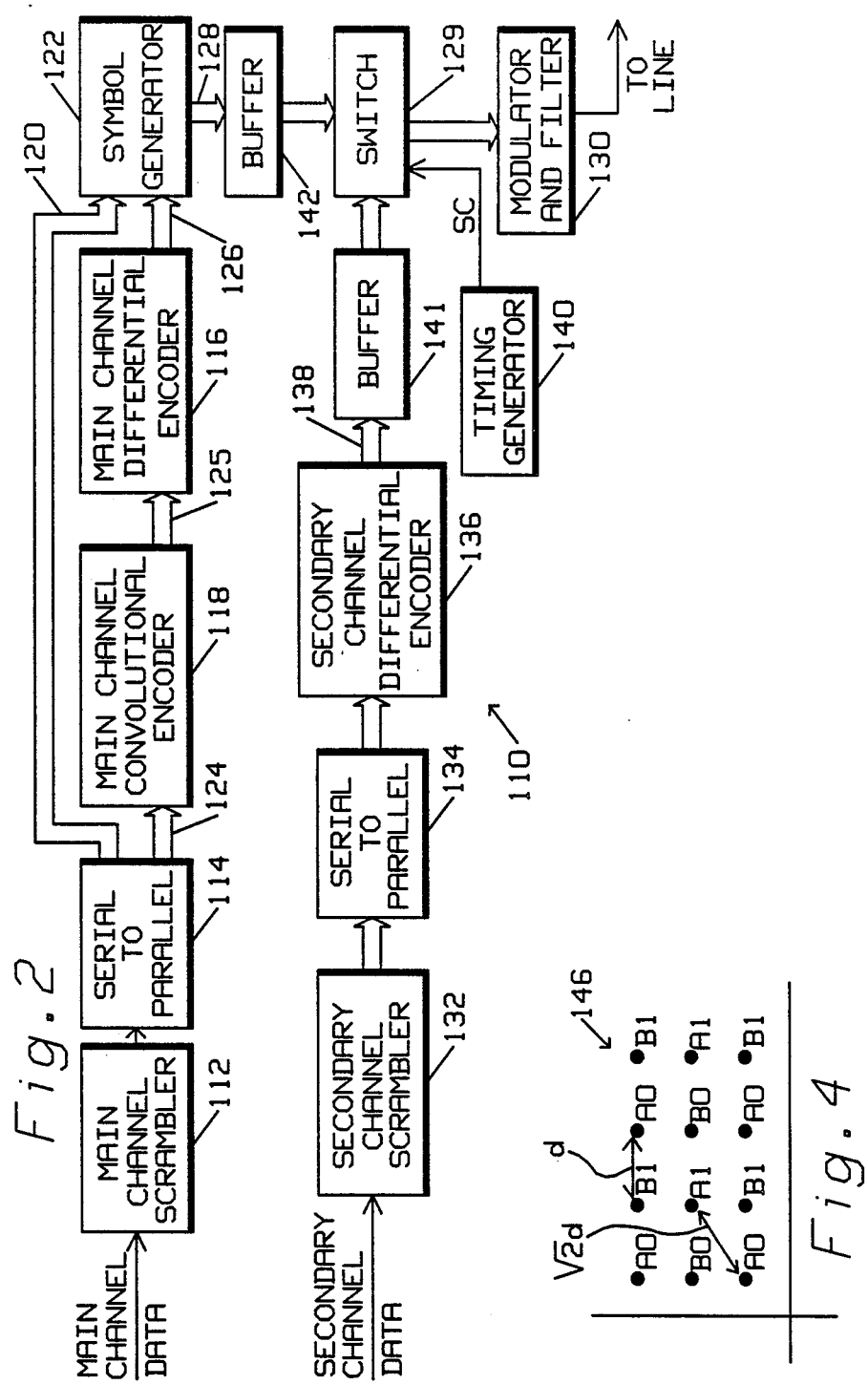
FIG. 2 shows a block diagram of a transmitter of a modem of a first embodiment of the present invention.
FIG. 4 shows a fragmented portion of the upper, right hand quadrant of the signal constellation and illustrates the distance properties in the main channel constellation.

Referring now back to FIG. 2, there is shown a block diagram of the generalized structure of a transmitter 110 of a single port modem in which a first embodiment of the present invention is implemented. In the transmitter 110, main channel data is provided to a main channel scrambler 112 which scrambles the data in a known manner. The scrambled data bits are then provided to a serial to parallel converter 114 which in turn provides the data in the form of a packet of parallel bits to a convolutional encoder 118. A portion of the bits of each packet, symbol-selecting bits 120, by pass the convolutional encoder 118 to a symbol generator 122. The remaining portion 124 of the bits of the packet are used by the convolutional encoder 118 to produce convolutionally encoded bits 125. These bits 125 are passed to a different encoder 116 to be differently encoded as will be described later.

The convolutional encoder 118 preferably, but not necessarily, is an encoder which allows for 2n dimensional coded modulation. In the preferred embodiment, for each packet, a portion of the output of the convolutional encoder 118, i.e., subset-selecting bits 126, form a frame of an even number of bits, i.e., the subset-selection bits in a frame consist of 2n bits. In other implementations, the frame can have an odd number of bits. The subset-selecting bits 126 are passed to the symbol generator 122. For each received packet, the subset-selecting bits 126 and symbol-selecting bits 120 form an input of the symbol generator that will be identified as the expanded bit sequence. Although the transmitter 110 for the main channel uses convolutional encoding, transmitter 110 can utilize any number of conventional modulation schemes, coded or uncoded, and the conventional multidimensional coded modulation scheme described hereinafter is merely illustrative of the preferred implementation. Those skilled in the art will appreciate that differential encoding may be omitted if desired.

In the preferred embodiment the symbol generator 122 uses a pair (i.e., bit group) of the 2n subset-selecting bits each baud (i.e., symbol interval/modulation period) to specify one of four subsets into which a symbol constellation is partitioned. The symbol-selecting bits 120 are used by the symbol generator 122 to select a symbol (i.e., signal point in constellation) from each subset. Consequently, each packet from the converter 116 is mapped onto a group of n 2-dimensional symbols in n bauds (one group interval), where $n>1$ and defines a multidimensional point (symbol) 128. The multidimensional symbols 128, after passing through a switch 129, are filtered in a conventional manner by bandwidth limiting filters and used to modulate a carrier in modulator and filter 130 to provide a modulated carrier signal to a band limited communication channel shown as a transmission line. The symbol generator 122 and modulator and filter 130 operate in conjunction with one another to define a multidimensional coded modulator.

Secondary channel data is passed to a secondary channel scrambler 132 which also acts in a conventional manner to scramble the secondary channel data which is then passed to a serial to parallel converter 134 which converts the secondary channel data to parallel form for use by a secondary channel differential encoder 136 which encodes, for example, each dibit (group of two bits in the data stream) as a phase change relative to the phase of the immediately preceding secondary channel symbol. Differential encoder 136 encodes the parallel secondary channel data using conventional four phase differential encoding in the preferred embodiment, but this is not to be limiting. Differentially encoded data 138 is passed through switch 129 and then processed by modulator and filter 130. In the preferred embodiment, the secondary channel does not use a redundancy coding, but this is not to be limiting since such coding could be used if desired. In the preferred embodiment, the fact that the secondary channel uses only four constellation points with relatively high average energy assures that the secondary channel is significantly more robust than the main channel, thus reducing the need for redundancy coding. In summary, any number of conventional signal constellations and modulation schemes can be used for either the main channel or the secondary channel; however, with each selected combination of main and secondary channel constellations, the secondary channel is more robust (e.g., better signal to noise ratio) than the main channel.

Switch 129 is used to combine the main channel data with the secondary channel data by essentially switching to a second constellation for the secondary channel when required. In the preferred embodiment, the main and secondary channel data are arranged in a manner in which the switch 129, under the control of a timing generator 140, respectively provides one frame of four bauds of differentially encoded secondary channel data followed by forty eight frames of convolutionally encoded data in groups of 4 bauds per frame. Those skilled in the art will appreciate that the main channel and secondary channel data may accumulate and be held in buffers 141 and 142, during the times when the other channel is being transmitted. Thus, a master frame of 49 groups of 4 baud frames are repeatedly transmitted with 48/49 of the master frame comprising convolutionally encoded main channel data and 1/49 of the master frame comprising a more robust secondary channel data. The choice of 49 groups of 4 baud frames with one frame containing secondary channel symbols and the remaining 48 frames containing main channel data provides advantages in the ability to divide the available bandwidth into groups of 100 Bps increments. This may be utilized advantageously in multiport embodiments to allow virtually any desired bandwidth for each port as will be appreciated by those of skill in the art. However, the present invention is not limited to the particular master frame and frame arrangement disclosed as preferred.

The specific structure of the transmitter 110 will now be described. Although the present invention relates primarily to the method and apparatus for providing secondary channel and synchronization to the modem, the preferred main channel transmitter is also described in detail for completeness. However, it should be noted that the present invention is not limited to the particular main channel rate or particular coding schemes or details of the main channel transmitter/receiver described herein as it can be used with virtually any data modem.

Figure 3A:
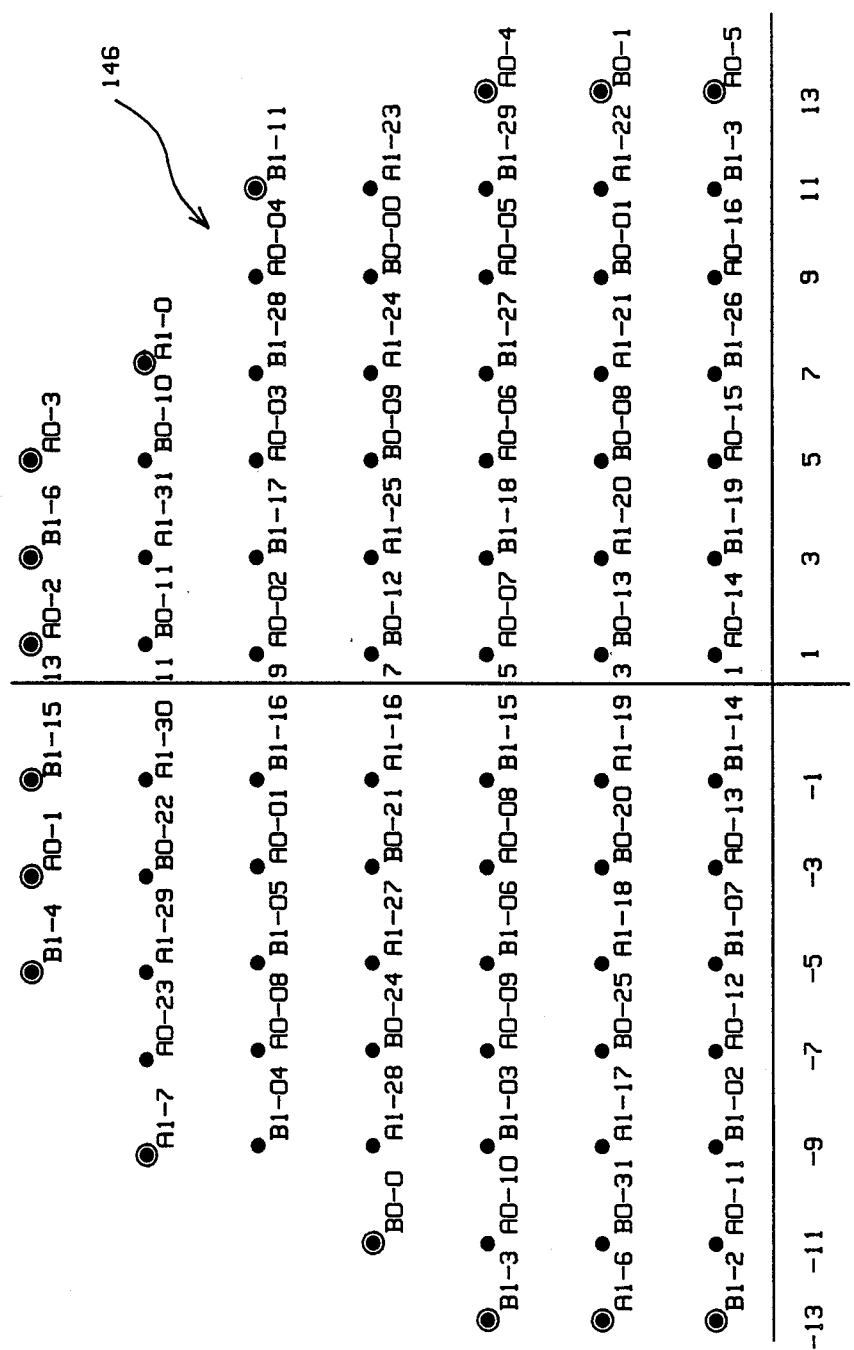
FIG. 3A shows the upper two quadrants of the complex plane of the signal constellation used with the main channel of the present invention.

The modem in which the present invention as preferably, but not necessarily, implemented transmits data at a rate of 19,200 bits per second. The symbol constellation 146 used by the symbol generator 122 of FIG. 2 is shown in FIGS. 3A and 3B, with upper two quadrants and lower two quadrants of the complex plane of the constellation 146 being shown, respectively, in FIGS. 3A and 3B. For purposes of illustration, the transmitter 110 uses eight dimensional coded modulation for the main channel data. The average main channel baud rate is 2742.86 symbols per second with 7 bits per baud. The baud rate of the secondary channel at 2 bits per baud is 57.14 symbols per second so that the maximum capacity of the secondary channel is 114.28 bits per second. The aggregate baud rate of the transmitter 110 including primary and secondary channel is 2800 symbols per second.

The main channel constellation 146 has 160 complex 2-dimensional symbols, i.e., signal points, with each symbol having a specific alphanumeric identifier. The symbols are divided up into outer and inner points, with a circle around each signal point that is an outside point. The symbol constellation 146 also is divided into four subsets A0, A1, B0, B1, which are the first portion of the symbol identifier. After the subset identifier, separately for both inner or outer symbol groups, the symbols within each subset are designated in the symbol identifier by the number after the hyphen. For example, the symbol identifier "A0-5" for a circled point indicates an outer point from the subset A0, with that particular point being designated by number 5 within the outer points of the subset A0. In summary, the main channel constellation is not only partitioned into four subsets of A0, A1, B0, and B1, but the constellation is also divided into a portion having inner points and a portion having outer points. Although the preferred embodiment has four subsets, different numbers and arrangements of subsets are possible. The units of the graph of FIGS. 3A and 3B are shown in volts.

Each subset in the main channel constellation is represented by a two bit number shown in Table 1.

TABLE 1

| Subset | Subset Index | |
|---|---|---|
| | MSB | LSB |
| A0 | 0 | 0 |
| B1 | 0 | 1 |
| B0 | 1 | 0 |
| A1 | 1 | 1 |

Thus, the subset-selecting bits 126 form an output of the (m, m-1) differential encoder 116 of FIG. 2 which can be represented by n 2-dimensional subsets of the form shown in Table 1. The integer m is equal to 2n plus the number of symbol selecting bits. MSB and LSB stand for most significant bit and least significant bit, respectively.

To better illustrate the subset to symbol mapping provided by the main channel symbol generator 122, a portion of the first quadrant of the symbol constellation 146 shown in FIG. 3A is enlarged and shown in FIG. 4. The symbols of the constellation 146 are on a square grid of the complex plane. From FIG. 4 it can be seen that the maximum Euclidean distance of $2^{\frac{1}{2}}(d)$ occurs between A0 and A1 as well as between B0 and B1. The minimum distance of d is between A0 and B0, A0 and B1, A1 and B0 and A1 and B1. The maximum Hamming distance also occurs between A0 and A1, as well as between B0 and B1.

Figure 5:
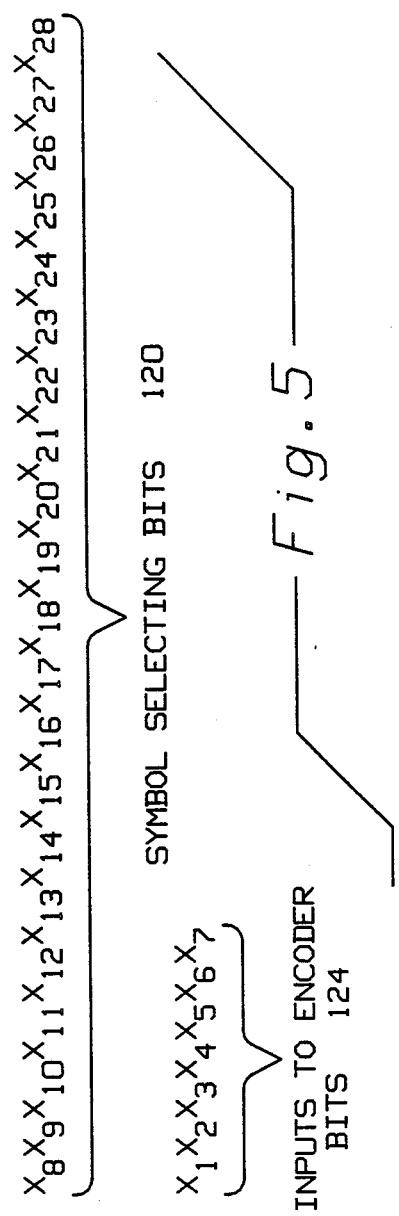
FIG. 5 shows a data packet utilized in the main channel encoder of the present invention.
Figure 6:
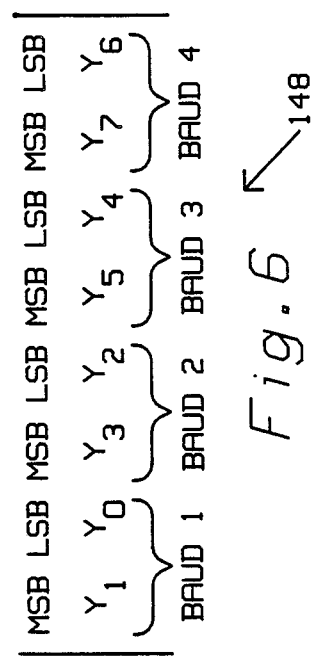
FIG. 6 shows a frame of the subset-selecting bits generated by the convolutional encoder.
Figure 7:
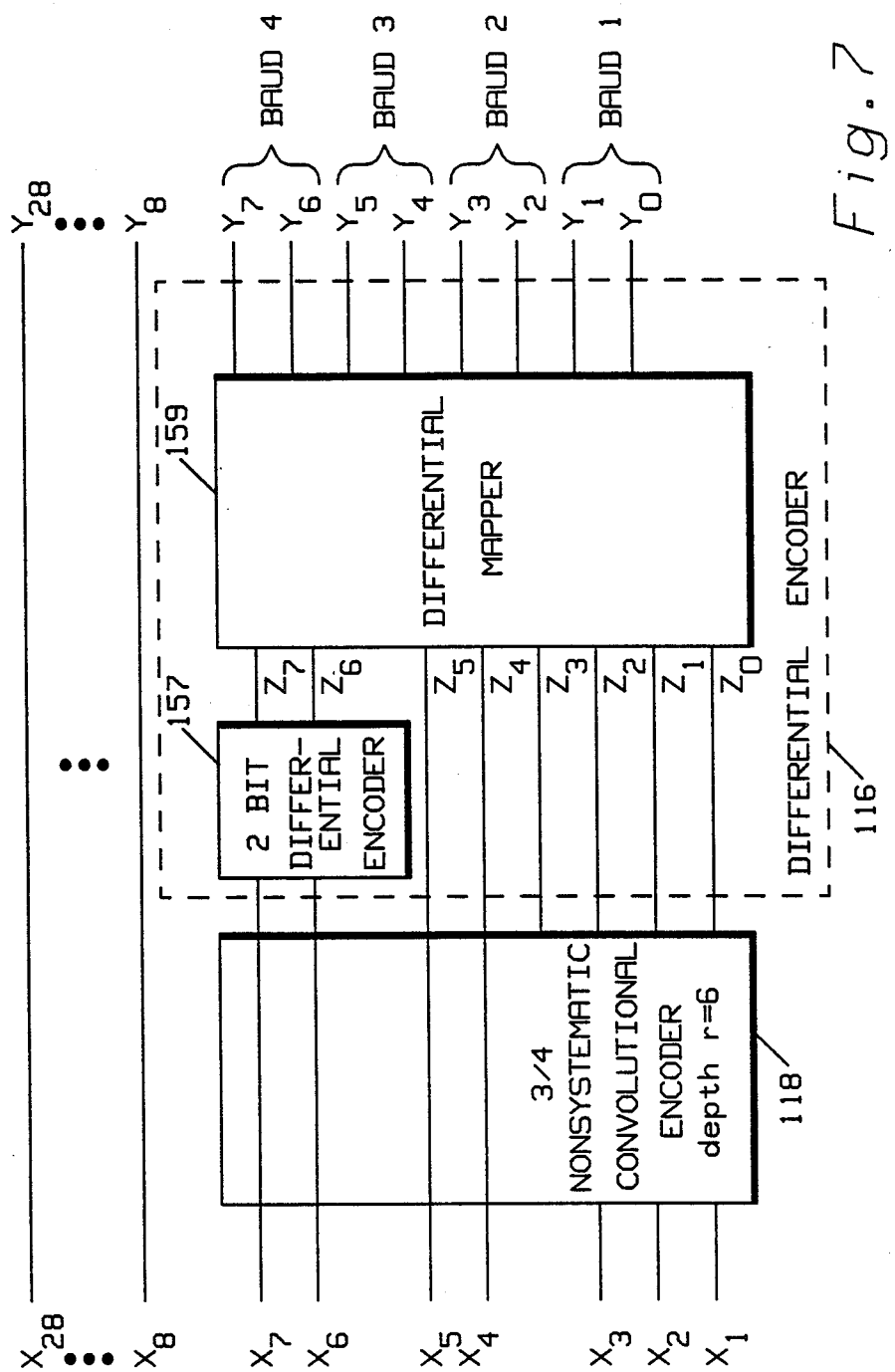
FIG. 7 shows the structure of an embodiment of the convolutional encoder.

FIG. 5 shows a packet of data generated by the main channel serial to parallel converter 114 of FIG. 2 which comprises 28 bits. The bits $x_8$–$x_{28}$ are the symbol-selecting bits 120. As shown in FIG. 7, bits $x_1, x_2, x_3, x_4, x_5, x_6,$ and $x_7$ form the input bits 124 to convolutional encoder 118. As shown in FIG. 7, the bits $x_7, x_6, z_5, z_4, z_3, z_2, z_1,$ and $z_0$ form the input to the differential encoder 116. The differential encoder 116 output bits are grouped into four bit groups ($y_7$ $y_6$), ($y_5$ $y_4$), ($y_3$ $y_2$) and ($y_1$ $y_0$) that define a frame 148 of bits. As will be explained hereinafter, bits $x_1$–$x_7$ form only a portion of the expanded bit sequence output of the encoder 118. FIGS. 6 and 7 show the assignment of bit groups for each baud in the frame 148, with each bit group defining a bit pair in the preferred embodiment. Each frame 148 has the duration of a group interval (time interval) that is four bauds in duration. Via Table 1, each bit group 150 corresponds to one of the four 2-dimensional subsets A0, A1, B0 and B1. A symbol is transmitted from one of the 2-dimensional subsets in each of the four bauds. When viewed on a multidimensional level, each frame 148 of eight bit output of the encoder 118 or 116 corresponds to one of 256 8-dimensional symbol subsets, with each multidimensional symbol subset corresponding to a different combination of four 2-dimensional symbol subsets. For example, the multidimensional symbol subset A1 B0 A0 B0 (11100010) corresponds to 2-dimensional symbol subsets (11), (10), (00) and (10).

From this point on superscripts indicate the order of the bits inside the frame and subscripts refer to the frame number in which the bits occur. For example, referring to frame 148 in FIG. 6, bit $x_7$ occurring in the nth frame will be referred to as $x_n^7$. Table 2 shows the assignment of points from inner and outer points of the constellation 46 shown in FIGS. 3A-3B for different values of $x_n^8$, $x_n^9$ and $x_n^{10}$. Bit $x_n^8$ indicates whether the frame 148 has any outer points or not. If the frame 148 (i.e., one of the bauds of the frame) were to have an outer point, then the dibit $x_n^9$ $x_n^{10}$ would indicate in which baud (and therefore bit group) the outer point would occur. In Table 2, "inner" means inner point and "Outer" means outer point.

TABLE 2

| $x_n^8$ | $x_n^9$ | $x_n^{10}$ | baud 1 | baud 2 | baud 3 | baud 4 |
|---|---|---|---|---|---|---|
| 0 | X | X | Inner | Inner | Inner | Inner |
| 1 | 0 | 0 | Outer | Inner | Inner | Inner |
| 1 | 0 | 1 | Inner | Outer | Inner | Inner |
| 1 | 1 | 0 | Inner | Inner | Outer | Inner |
| 1 | 1 | 1 | Inner | Inner | Inner | Outer |

Table 3 shows how the symbol-selecting bits 120 of FIGS. 2 and 5 are assigned with each group of $x_n^8$, $x_n^9$, and $x_n^{10}$.

TABLE 3

| $x_n^8$ | $x_n^9$ | $x_n^{10}$ | baud 1 | baud 2 | baud 3 | baud 4 |
|---|---|---|---|---|---|---|
| 0 | X | X | $x_n^9$-$x_n^{13}$ | $x_n^{14}$-$x_n^{18}$ | $x_n^{19}$-$x_n^{23}$ | $x_n^{24}$-$x_n^{28}$ |
| 1 | 0 | 0 | $x_n^{11}$-$x_n^{13}$ | $x_n^{14}$-$x_n^{18}$ | $x_n^{19}$-$x_n^{23}$ | $x_n^{24}$-$x_n^{28}$ |
| 1 | 0 | 1 | $x_n^{11}$-$x_n^{15}$ | $x_n^{16}$-$x_n^{18}$ | $x_n^{19}$-$x_n^{23}$ | $x_n^{24}$-$x_n^{28}$ |
| 1 | 1 | 0 | $x_n^{11}$-$x_n^{15}$ | $x_n^{16}$-$x_n^{20}$ | $x_n^{21}$-$x_n^{23}$ | $x_n^{24}$-$x_n^{28}$ |
| 1 | 1 | 1 | $x_n^{11}$-$x_n^{15}$ | $x_n^{16}$-$x_n^{20}$ | $x_n^{21}$-$x_n^{25}$ | $x_n^{26}$-$x_n^{28}$ |

FIG. 7 shows the convolutional encoder 118 and differential encoder 116 of FIGS. 1 and 5 in detail as used for transmission of the main channel data. The encoder 118 is a ¾ nonsystematic convolutional encoder with constraint length 6 as described in "Short Binary Convolutional Codes with Maximal Free Distance for Rates ⅔ and 182", By Erik Paaske, IEEE Transactions on Information Theory, September 1974, pp 683–689. As previously described, the input bits to the encoder are $x_n^i$, where i=1 through 28 and the output are $y_n^i$, where i=0 through 28. As is well-known, the encoder adds one redundancy bit; however, in the preferred embodiment the encoder adds less than one bit per baud of redundancy into the system. Encoders with redundancies greater than one bit (and therefore redundancy of one or greater per baud) can be used with the present invention. Input bits $x_n^8$ through $x_n^{28}$ are passed through unchanged and unused to become output bits $y_n^8$ through $y_n^{28}$. Inputs $x_n^4$-$x_n^7$ are used but pass through the encoder 118 without being changed.

The differential encoder 116 includes a 2-bit differential encoder 157 and a differential mapper 159. The 2-bit differential encoder is of conventional design similar to that of 136 to provide modulo 90° phase hit protection. The differential mapper operates according to the following equations:

(EQUATION 1)

$$
\begin{aligned}
y7 &= z7 \\
y6 &= z7 + z6 = y7 + z6 \\
y5 &= z7 + z5 + z4 + z6 \cdot z2 + z0 \\
y4 &= z7 + z6 + z5 + z4 + (z6) \cdot z2 + \\
    & \quad z0 = y5 + z6 + z2 \\
y3 &= z7 + z3 \cdot z6 + z4 + z0 + (z3 + z2) \cdot (z1 + z0) \\
y2 &= z7 + (z3) \cdot z6 + z4 + z3 + z0 + \\
    & \quad (z3 + z2) \cdot (z1 + z0) = y3 + z6 + z3 \\
y1 &= z7 + (z0 + z1) \cdot z6 + z5 + (z0 + z1 + z2) \cdot \\
    & \quad z3 + z2 + z1 \\
y0 &= z7 + (z0 + z1) \cdot z6 + z5 + (z0 + z1 + z2) \cdot \\
    & \quad z3 + z2 + z0 = y1 + z6 + z1 + z0
\end{aligned}
$$

Where Overscore means compliment and > means AND.

The convolutional encoder operates according to the following equations:

(EQUATION 2)

$$
\begin{aligned}
Y_n^3 &= X_n^3(1+D) + X_n^2(D+D^2) + X_n^1 D \\
Y_n^2 &= X_n^3 D^2 + X_n^2 + X_n^1(D+D^2) \\
Y_n^1 &= X_n^2 D^2 + X_n^1(1+D+D^2) \\
Y_n^0 &= X_n^3(1+D+D^2) + X_n^2(1+D) + X_n^1
\end{aligned}
$$

Figure 8:
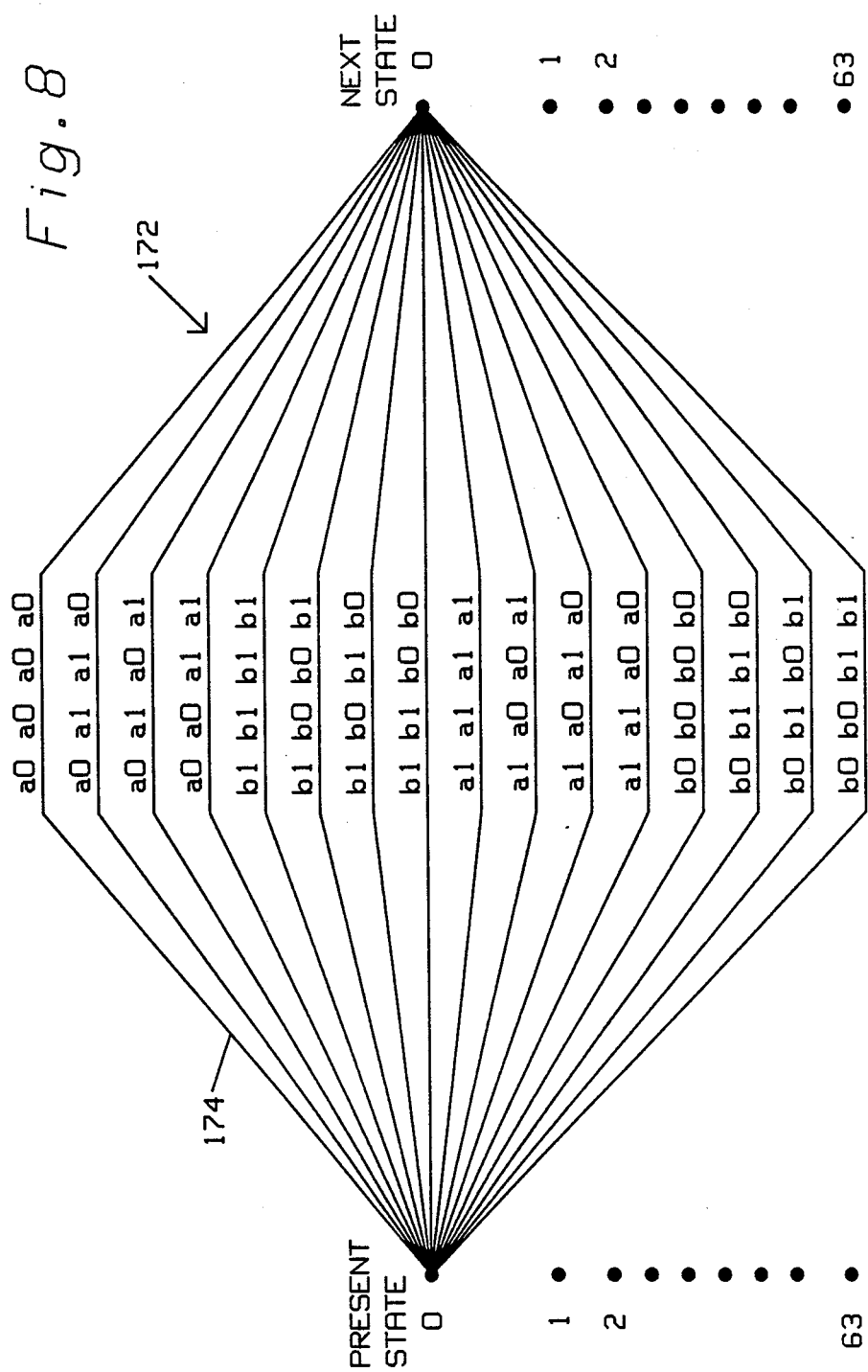
FIG. 8 shows two states of the trellis with the branches shown between the present state zero and the next state zero.

The convolutional encoder 118 is a finite state device which passes through a succession of states, with each state being separated in time by one group interval. Referring to the trellis diagrams in FIG. 8, the encoder 118 has 64 possible states (not all shown). Due to the fact that the encoder 118 has three binary inputs, for a given present state, only 8 of the next states are permissible. Which next state occurs is a function of the present state and on the combination of the $x_n^1$, $x_n^2$, and $x_n^3$ bits received each group interval. Each transition from one state to another state is identified as a branch. In general, the trellis can be used to diagram all permissible transitions between the present state to the next state of the encoder, although only the branches 174 between present state 0 and next state 0 are shown in FIG. 8. There are 256 possible branches which exist in the trellis. These 256 branches are subdivided into two groups of 128 branches each. The branches from a present state to a next state can be either from one or the other group. Extending from the present state 0, 128 branches exist in the trellis 172, with 16 branches going to each of 8 permissible next states (only one set of 16 is shown).

Likewise, 128 branches can extend from each present state in the same manner and this is extended continuously between adjacent states separated by group intervals. In the preferred embodiment, the group used of the two groups of 128 branches alternates with the states, e.g., state 0 using one group and state 1 using the other group and so on.

Further details of an embodiment of a 19.2k BPS modem similar to that of the preferred embodiment may be found in U.S. Pat. application Ser. No. 055,805 filed May 29, 1987 to Srinivasagopalan et al. which is incorporated by reference.

Figure 9:
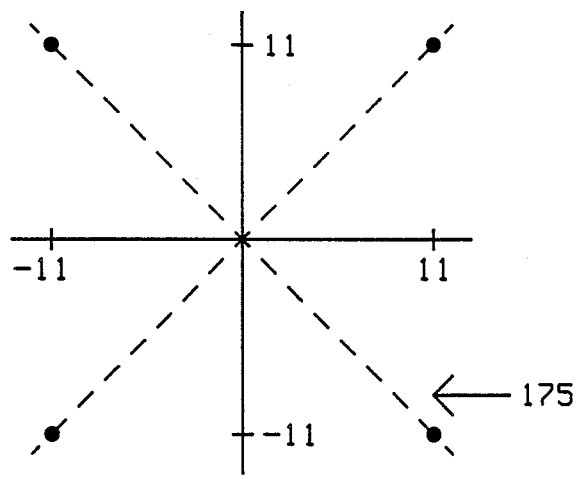
FIG. 9 is a diagram of the constellation used for transmission of the secondary channel data in the preferred embodiment of the present invention

Turning to FIG. 9, the constellation 175 used in one embodiment for transmission of the secondary channel data is shown. This is essentially the constellation used for 2400 Bps communication as defined by C.C.I.T.T. Specification V.27 bis, VIIth Plenary Assembly, November, 1980. The preferred dibit values and phase changes are as shown in Table 4. The left most dibit value is the first in time and the right most dibit value is the last in time. The phase change is relative to the phase of the preceding secondary channel symbol. Therefore, the absolute phase of the last transmitted symbol of secondary channel data in the master frame is held in a register until the first transmitted secondary channel symbol in the next master frame so the phase change can be computed.

| DIBIT VALUE | | PHASE CHANGE |
|---|---|---|
| 0 | 0 | 0° |
| 0 | 1 | 90° |
| 1 | 1 | 180° |
| 1 | 0 | 270° |

Figure 10:
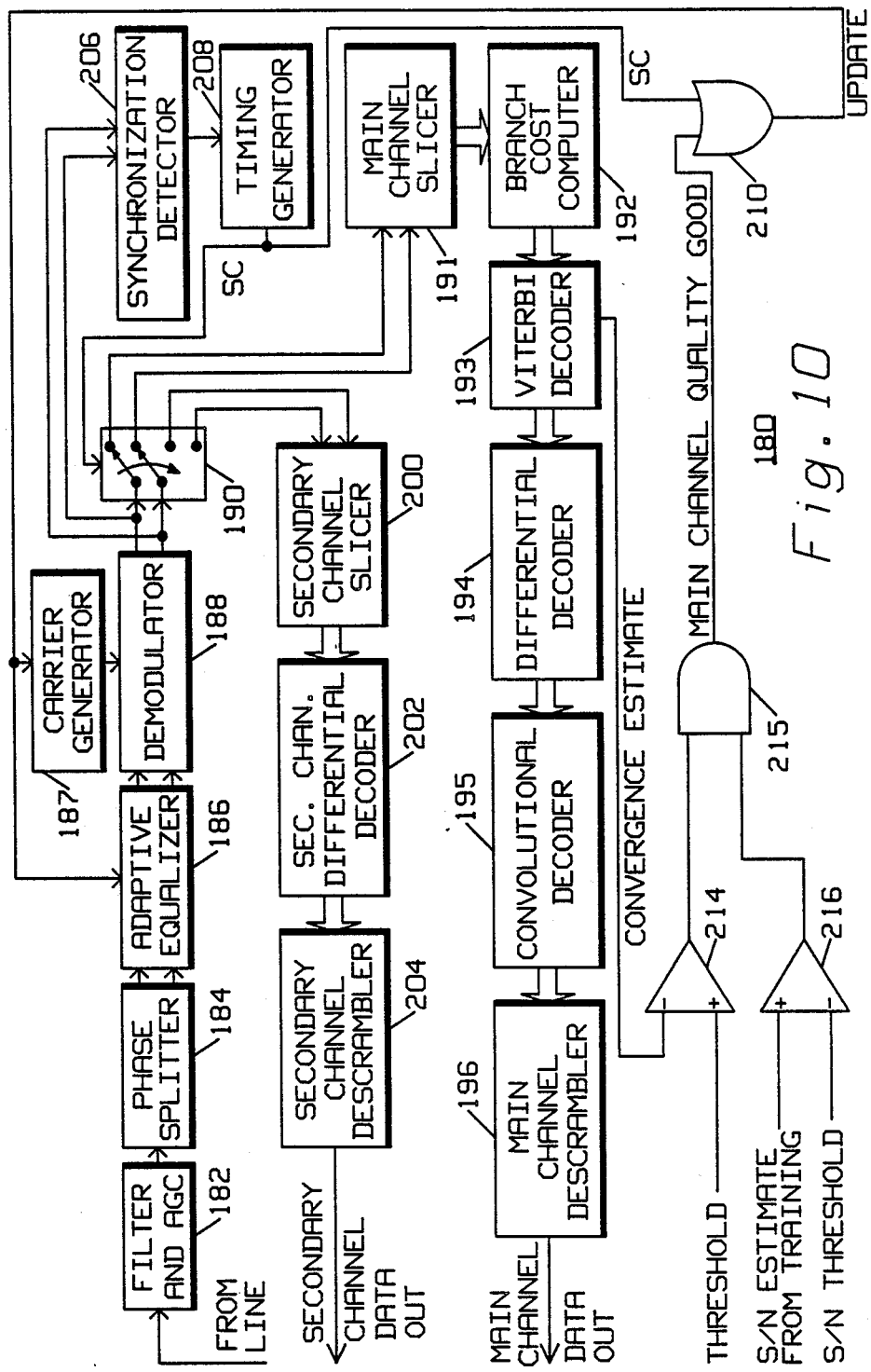
FIG. 10 is a block diagram of the receiver of one embodiment of the present invention.

A receiver 180 of the modem is generally shown in the block diagram of FIG. 10 and includes a filter and automatic gain control (AGC) 182 coupled to the transmission media. The filtered and gain controlled signal is passed to a phase splitter 184 which converts the signal into in phase and quadrature components in a known manner and passes the components to a passband adaptive equalizer 186. The equalized signals from adaptive equalizer 186 are converted from passband to a 2 dimensional baseband signal by a demodulator 188 and then passed through switch 190.

During periods of receipt of main channel data, the complex baseband signals from the demodulator 188 are switched by the sitch 190 to a slicer 191, branch cost calculator 192, Viterbi decoder 193. The decoded signal from the Viterbi decoder 193 is passed to a main channel differential decoder 194 and then to a convolutional decoder 195 and a main channel descrambler 196 where the main channel data are decoded and descrambled to produce main channel data out. Embodiments of the slicer 191, branch cost calculator 192, and Viterbi decoder 193 are described in detail in copending U.S. Pat. application No. 004,389 to Srinivasagopalan et al on Jan. 15, 1987, which is incorporated by reference. There are a number of designs known to those skilled in the art for these components which can be used with the present incentive; however, for the purpose of background for the present invention, each of these components will be generally described hereinafter.

During periods of receipt of secondary channel data, the complex baseband signals from demodulator 188 are switched by switch 190 to a conventional secondary channel slicer 200 which determines by a hard decision which of the four possible phases have been transmitted. The output of secondary channel slicer 200 is passed to a secondary channel differential decoder 202 for decoding in a conventional manner. The decoded data from decoder 202 are then descrambled by a secondary channel descrambler 204 in a known manner. Descramblers 196 and 204 preferably operate in a similar manner and those skilled in the art will recognize that a single descrambler circuit or routine may be utilized for both main and secondary channel by appropriate modification without departing from the present invention.

The output of the demodulator 188 is also applied to a synchronization detector 206, the operation of which will be described later, which extracts frame synchronization information for use by the receiver 180. This information is also provided to a timing generator 208 which controls the piston of switch 190 so that the baseband signals from the signals from the secondary channel are processed by secondary channel slicer 200 the baseband signals from the main channel data are processed by the main channel slicer 191. The switch 190, in steady state operation will be at the position shown (main channel) for 48/49 of the time and at the opposite position (secondary channel) for 1/49 of the time in the preferred embodiment.

Since the secondary channel is substantially more immune to noise than the main channel by virtue of having a higher average energy level and fewer, more distant signal points (i.e., symbols) when line quality is poor, it is desirable to provide a certain adjustments and adaptations during period of secondary channel activity only for the secondary channel. This may be accomplished under steady state conditions by the following. The timing generator 208 produces an output "SC" during time of activity of the secondary channel as shown in the timing diagram of FIG. 11B. This output is passed through an OR decision 210 to produce an "UPDATE" signal which authorizes adaptation of adaptive equalizer 186 and/or may be used to authorized adjustment in the frequency of a carrier generator 187 used by demodulator 188 or other adjustments which may be needed. A convergence estimate such as mean square error or cost from Viterbi decoder 193 is applied to a comparator 214 wherein the convergence estimate, e.g., minimum cost, is compared with a predetermined threshold. If this cost is below the threshold, the signal is applied to an input of an AND decision 215. Also, a signal to noise ratio estimate from the training process is compared to a signal to noise ratio threshold in a comparator 216. It's output is also applied to AND decision 215. The output of AND 215 is indicative of main channel signal quality and is applied to the second input of the OR decision 210. In this manner, when there is good main channel signal quality, carrier generator 187 and adaptive equalizer 186 are both allowed to adapt during periods of both main and secondary channel activity. Otherwise adaption only occurs during the secondary channel.

Referring to FIG. 10, the operation of the slicer 191 will be described. As previously mentioned frames of four 2-dimensional signals define a received multidimensional signal. Each received multidimensional signal provides information in the form of the multidimensional subsets of the multidimensional points sent. As previously mentioned, the received 8-dimensional signal can be decomposed into four 2-dimensional signals which occur consecutively. More specifically, each frame of the received multidimensional signal can be represented as R(1), R(2), R(3), and R(4), where:

$$R(J) = [RX(J)], \ 1 < J < 4 \quad \text{(Equation 3)}$$

A symbol (ideal point) in the signal constellation can be represented as:

$$IDL(K, L, N) = [IDLX(K, L, N), IDLY(K, L, N)] \quad \text{(Equation 4)}$$

where
- K=0 means that the point is inner
- K=1 means that the point is outer
- L=1 means that the point belongs to subset A0
- L=2 means that the point belongs to subset B1
- L=3 means that the point belongs to subset B0
- L=4 means that the point belongs to subset A1 and
- N=index of the point in the subset.

In the preferred embodiment, N can take on values from 0 to 31, if the point belongs to the inner part of the constellation (that part comprised of inner points) and N=0 to 7 for points on the outer part of the constellation (that part comprised of outer points). For each K, L and J, the slicer 191 finds that $N = N_{min}$, such that $$|R(J) - IDL(K, L, N_{min})|^2 < |R(J) - IDL(K, L, N)|^2 \text{ where}$$

$$|R(J) - IDL(K, L, N)|^2 = |RX(J) - IDLX(K, L, N)|^2 + \quad \text{(Equation 5)}$$

$$|RY(J) - IDLY(K, L, N)|^2$$

The slicer 191 thus finds eight nearest points for the received signal of each baud such that four are inner points and four are outer points. A pair of inner and outer points belong to each of the four subset A0, B0, B1 and A1. For each baud of the four baud frames, we can denote the distance (metric) between each of the ideal point and the received point as d[J, K(J), L(J), $N_{min}(J)$]. Thus $$|R(J)-IDL(K, L, N_{min})|^2 < |R(J)-IDL(K, L, N)|^2 \quad \text{(Equation 6)}$$

As previously explained, each branch of the trellis corresponds to a possible multidimensional symbol subset (therfore a four baud signal in the frame) and in this embodiment there are 256 branches, i.e., A0 A0 A0 A0 through A1 A1 A1 A1. For each branch we can construct five possible signal combinations of 2-dimensional subsets having inner (In) and outer (Out) points as shown in Table 5.

| | | | |
|---|---|---|---|
| In | In | In | In |
| Out | In | In | In |
| In | Out | In | In |
| In | In | Out | In |
| In | In | In | Out |

In Table 5 we assume that the left most signal of the frame belongs to the first baud and the right most signal is that of the fourth baud.

Referring to FIG. 10, the branch metric computer 192 computes the branch metric term, which can be either equal to or proportional to $d_{BRANCH}(I)$ where $d_{BRANCH}(I)$ is defined by:

$$d_{BRANCH}(1) = [d^2(1, K(1), L(1), N_{min(1)}) + \quad \text{(Equation 7)}$$

$$d^2(2, K(2), L(2), N_{min(2)}) + d^2(3, K(3), L(3), N_{min(3)}) +$$

$$d^2(4, K(4), L(4), N_{min(4)})]$$

This computation is done for each of the five combinations shown in Table 5 and the combination with the least value is chosen as the metric for the branch. The index I identifies the branch and extends from 0 to 255, showing that this calculation is repeated for each branch. Consequently, at this point we have 256 $d^2$ values, one for each of the 256 branches, with each squared distance $d^2$ value representing the squared distances between the received 2-dimensional signal and the contending 2-dimensional symbol subsets. As shown in incorporated U.S. patent application No. 004,389, other designs of the branch metric computer 192 are possible, including not calculating the five possibilities of Table 5 until after Viterbi decoder calculations.

Next, the branch metric computer 192 selects for each coset (group of 16 branches each) that branch which has the minimum branch metric, which results in reducing the number of contending branches (multidimensional symbol subsets) from 256 to 16. Only one branch of each coset can form a part of the maximum likelihood path. Thus, the described reduction by a factor of 16 of the contending branches is based upon which branch of said coset represents the multidimensional symbol subset which is closest to the received multidimensional signal.

Generally, the Viterbi decoder in the receiver 180 uses the received multidimensional signals to estimate the original path of the encoder 118 through the trellis, such trellis being discussed with respect to FIG. 8. The maximum likelihood path is determined by finding the possible sequence of multidimensional symbol subsets (which trellis path) which is closest to the sequence of received multidimensional signals. During every frame, the receiver computes the minimum cost path and from the path history, determines the estimated multidimensional symbol.

As is well-known, the Viterbi decoder, during each frame (group interval) extends each of the surviving paths to their successor state at the next frame. The metric of the extended path is obtained by adding the metric of the survivor to the branch metric of the corresponding branch which extends the path. The survivor at the next frame at a given state is found by comparing the metrics of all the extended paths which connect to a given state and choosing the minimum. More specifically, extending the path history can be mathematically characterized by computing:

$$c(i, n) = \underset{j}{\text{Minimum}}\{c(j, n-1) + r(i, j)\} \quad \text{(Equation 8)}$$

where $c(j, n-1)$ is the surviving metric of the jth state at time $t=(n-1)T_{frame}$, $r_{(i,j)}$ is the branch metric of the output branch which connects the jth state at time $t=(n-1)T_f$ to the ith state at $t=nT_f$. $c(i,n)$, the cost at the ith state at time $t=nT_f$, is obtained by minimizing over all j which are connected to state i. Thus, the path history of the surviving paths is extended. Once the path history is extended the Viterbi decoder finds the minimum cost path among the survivors, and from the path history outputs the best estimate of the multidimensional symbol subset for the group interval to a conventional decoder and differential decoder. The delay between the present frame and the present estimate (of the past symbol) can be 3v frames, where v is the constraint length of the convolutional encoder 118 and in this preferred case is 6.

From the retained knowledge of the received multidimensional signal and from the knowledge of the closest multidimensional symbol subset of the maximum likelihood path, the best estimate of the transmitted multidimensional symbol (point) is obtained. From the estimated, transmitted multidimensional signal the received data is processed in a well known manner using a differential decoder 194, a convolution decoder 195, a parallel to serial converter (not shown) and a main channel descrambler 196.

In receiver 180, the receiver operations are of the branch cost computer 192 and Viterbi decoder 193 synchronized to the received frames of the incoming signal i.e., the receiver must know the beginning of each frame. In other words, the receiver must determine which bit group in the received frame of subset-defining bits corresponds to the bit group ($y_1 y_0$) in the transmitted subset defining bits. Moreover, the receiver 180 must distinguish between received frames for the main and secondary channels. In other words, it must find the beginning of each master frame. Having found this starting bit group, the received frame of received subset defining bits is synchronized with the consecutive frames of subset-defining bits transmitted as well as the secondary channel data The way in which frame and master have synchronization is accomplished will be discussed hereafter.

Figure 11:
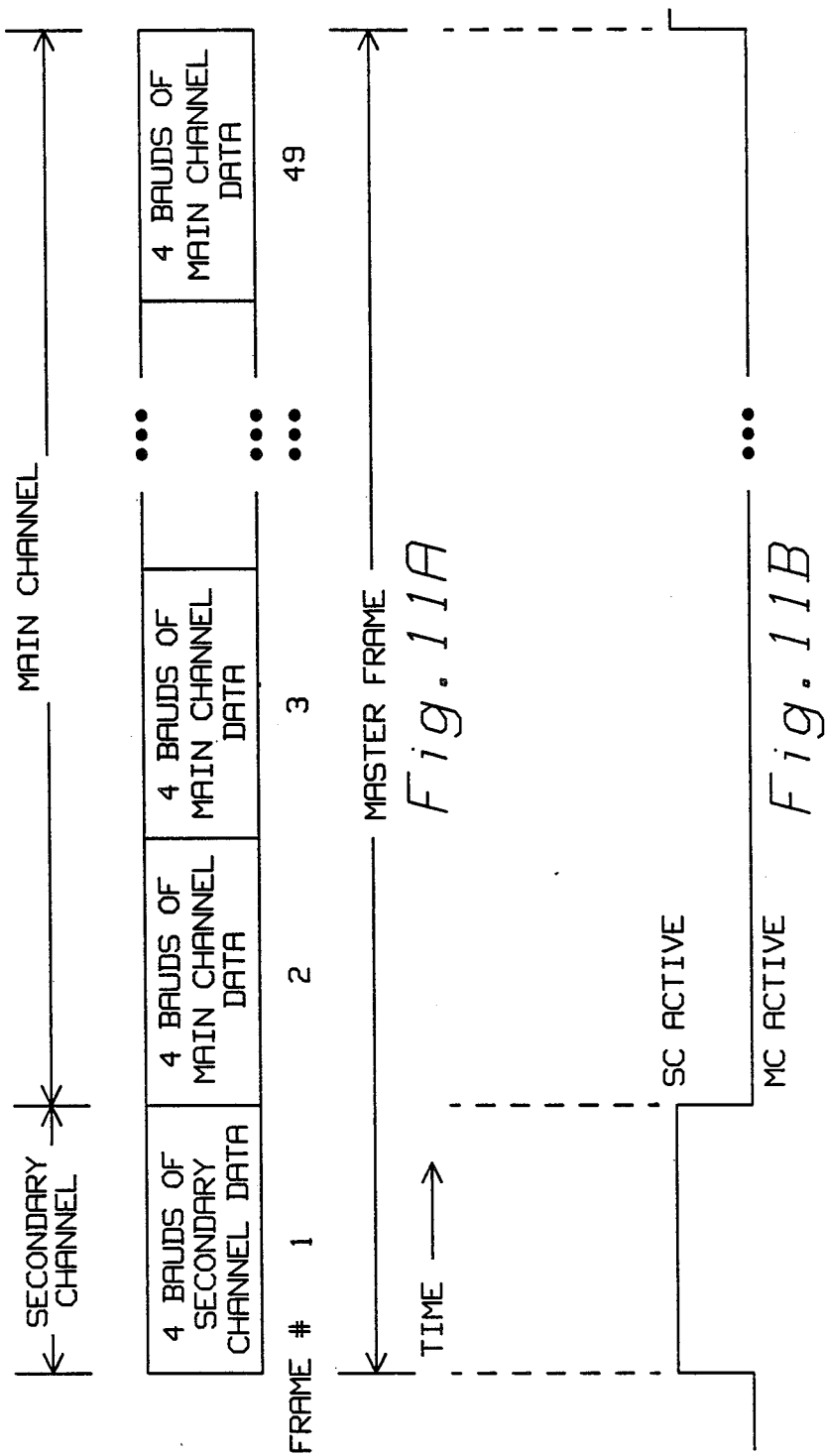
FIG. 11A is a diagram of a master frame of main and secondary channel data as used in the preferred embodiment of the present invention.
FIG. 11B is a timing diagram for the main channel and secondary channel timing.

Turning to FIG. 11A the framing of the steady state data is illustrated. The data symbols are assembled into master frames comprising 49 frames of symbols. The first frame of each master frame is reserved for secondary channel data. This first frame carries four bauds of four phase DPSK symbols or the equivalent of 8 bits of data. Frames 2-49 are reserved for main channel (or channels) data with each frame also carrying four bauds of data. In the preferred embodiment of a 19.2k Bps modem, this equates to 28 bits per frame of main channel data at 7 bits per baud. Using a baud rate of 2800 Hz results in the desired 19.2k Bps main channel data rate and a secondary channel rate of 114.28 Bps if 2 bits per symbol are used. It should be noted that three bits per symbol could also be used to increase the secondary channel rate by 50%. Since current systems often operate at a secondary channel rate of 75 Bps, this secondary channel rate will meet the needs of most diagnostic and network management systems.

The secondary channel may advantageously be used at the modem receiver for synchronization. Consider the folowing average energy statistics of various constellations commonly used at the main channel speeds listed on Table 6.

| SPEED | AVERAGE ENERGY |
|---|---|
| 19.2 | 94.28 |
| 16.8 | 52.00 |
| 14.4 | 28.50 |
| 12.0 | 15.00 |

By appropriate selection of constellation points for the secondary channel, the main channel loss can be minimized or eliminated while allowing for a significant improvement in secondary channel signal to noise ratio when compared with that of the main channel. Table 6 shows a point selection which provides for only a small loss in main channel performance while providing enhancement of secondary channel performance over that of the main channel adequate to allow easy detection of secondary channel data and use for synchronization. These constellation points should not be considered limiting, however, since other tradeoffs may be appropriate under other design constraints. Table 7 tabulates the impact of selection of various preferred points on the main channel performance.

| MAIN CHANNEL SPEED | SEC. CH. VECTOR | AVE. ENERGY WITH SEC. CH. | LOSS (DB) | VECTOR ENERGY |
|---|---|---|---|---|
| 19.2 | 11,11 | 97.295 | 0.137 | 242 |
| 16.8 | 9,9 | 54.245 | 0.184 | 162 |
| 14.4 | 5,5 | 28.935 | 0.066 | 50 |
| 12.0 | 5,5 | 15.710 | 0.202 | 50 |

Using the above secondary channel vector for the points on the constellation of FIG. 19 the secondary channel is able to remain substantially error free at noise levels substantially higher than those which render the main channel data useless. Since the vector energy for each of the secondary channel vectors is significantly higher in average energy than the main channel constellation, and since each secondary channel frame includes four consecutive bauds of this relatively high energy level, the frame of secondary channel may be readily distinguished from the main channel data. This fact can be used advantageously for synchronization of the receiver to the transmitter as will be described shortly.

Figure 12:
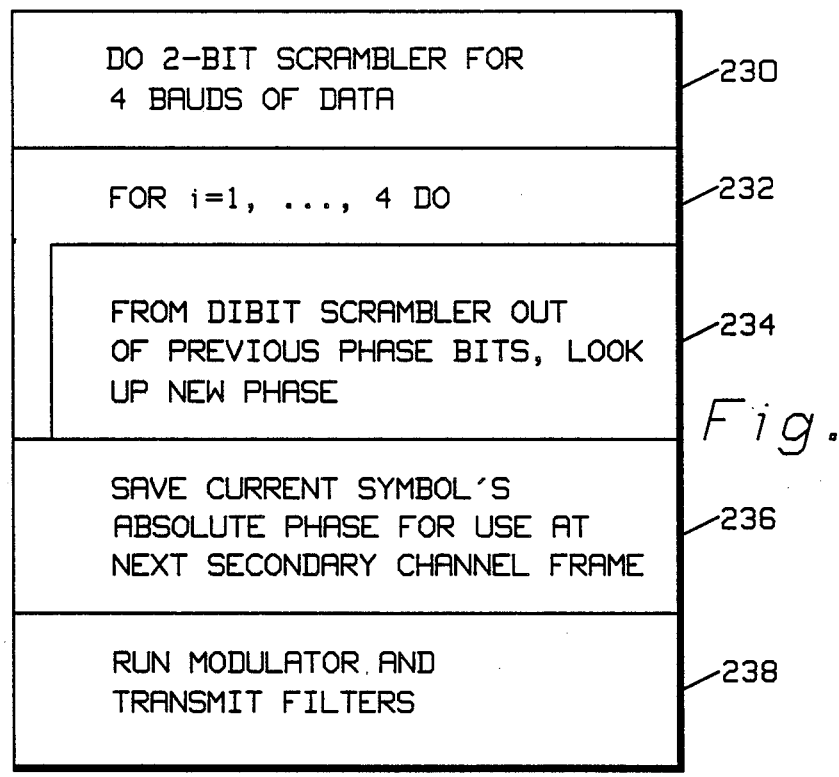
FIG. 12 is a flow diagram of the secondary channel transmitter of the present invention.

Turning now to FIG. 12, a flow chart of the overall operation of the secondary channel transmitter is shown. At step 230, a dibit (two bit) scrambler is impelmented for four bauds of secondary channel data. Then at the loop defined by 232 and 234, the dibit scrambler output of the previous phase bits is used to look up the new phase to be transmitted for each of the four bauds of secondary channel data. At step 236, the absolute phase of the last symbol transmitted is stored in a register for use by the first symbol of the next secondary frame to be transmitted. At 238 the modulator transmits the symbols through a filter to the transmission channel. The process then awaits the next frame of secondary channel symbols.

Figure 13:
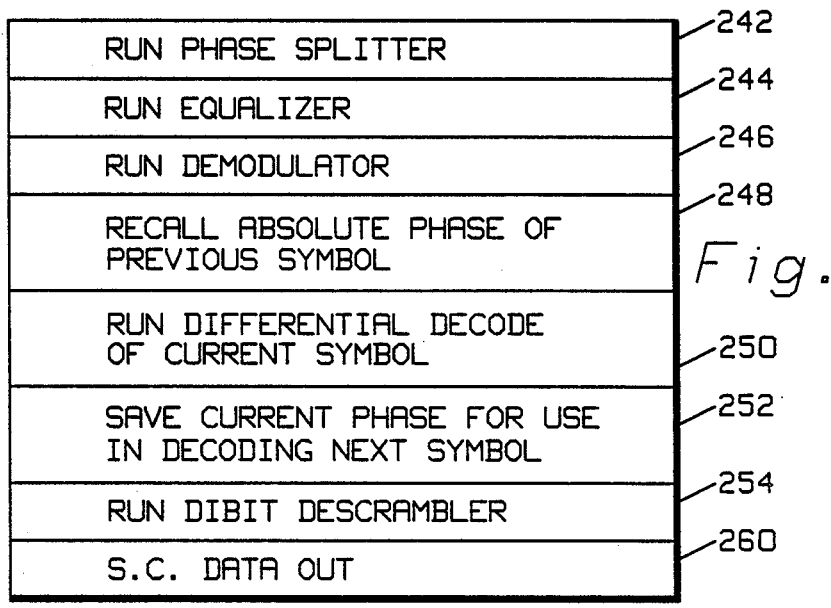
FIG. 13 is a flow diagram of the secondary channel receiver of the present invention.

Turning to FIG. 13, the overall operation of the secondary channel receiver is described. At step 242, the incoming secondary channel symbols are passed through a phase splitter. The output of the phase splitter is passed through an equalizer at 244 and then demodulated at 246. The absolute phase of the last symbol of the previous frame is recalled at 248 and the symbols are then decoded at 250 by the differential decoder. The current absolute phase of the last symbol is saved at 252 for use in decoding the next secondary frame. At 254 the data are descrambled with a dibit descrambler and the decoded and descrambled output is available at 260.

Figure 14:
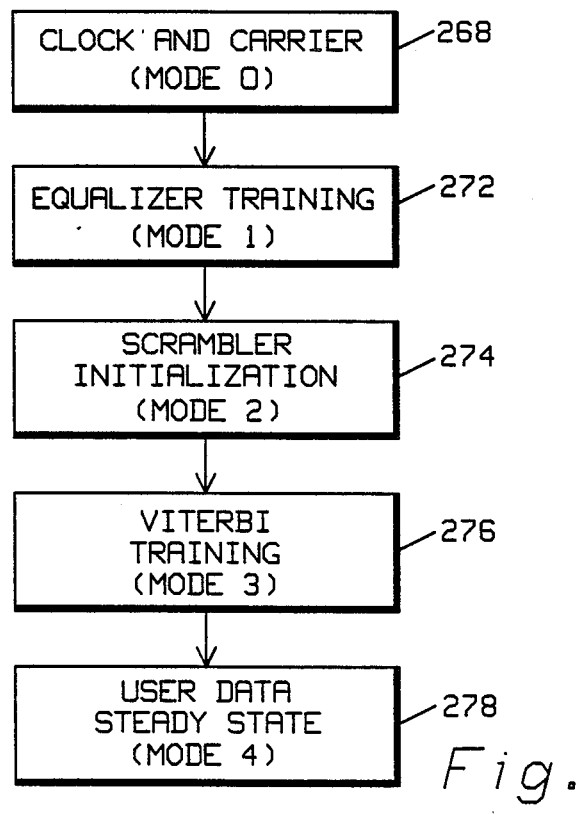
FIG. 14 is a flow chart of the training process of the present modem.

As is known in the art, high speed modems generally require a training period to initially acquire synchronization and adapt to the conditions of the particular line. The preferred training sequence is shown in general in FIG. 14. Other training procedures and training sequences may be used as is known in the art. At stage 268, a period of clock and carrier training is undertaken. This clock and carrier training period wherein only carrier and clock information lasts approximately 256 bauds and is referred to as mode 0. At 272, the equalizer and scrambler at the receiver is trained by transmission of random four phase information. This stage lasts for 8400 bauds in one embodiment and is referred to as mode 1. At 274 the scrambler is initialized during this same period of random four phase information. At 276 the Viterbi decoder is synchronized. This stage is referred to as mode 3 and lasts for 256 bauds in the present embodiment. At 278, the steady state condition is reached and user data is processed while fine adjustments and adaptations continue. This stage is referred to as mode 4.

Figure 15:
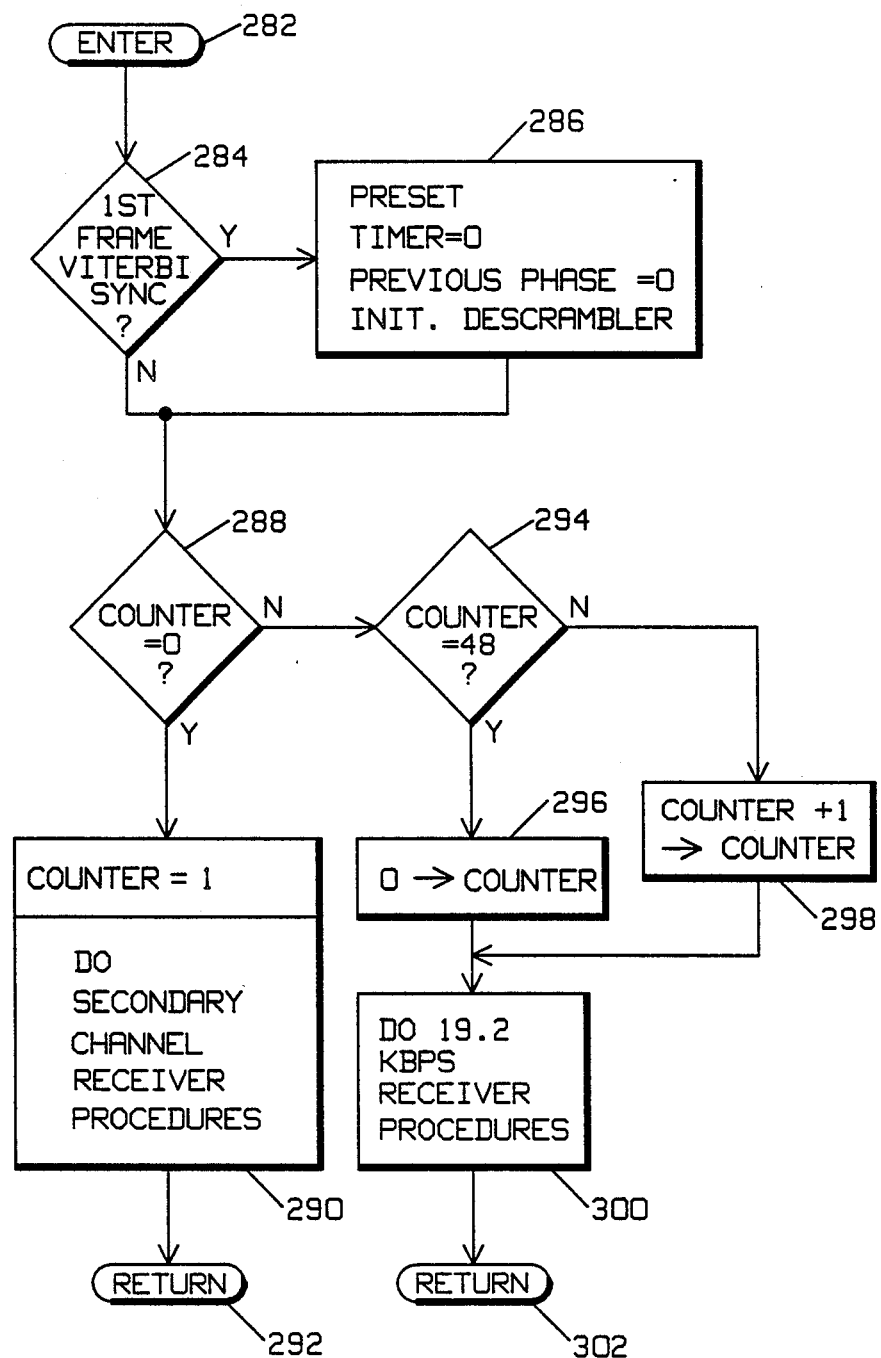
FIG. 15 is a flow chart of the modem receiver of the present invention.

The secondary channel receiver operation is integrated with the main channel operation in the steady state condition as shown in FIG. 15 which begins at step 282. If this is the first frame of Viterbi synchronization (mode 3) at step 284, the timer and previous phase register are set to zero and the secondary channel descrambler is initialized at step 286. Otherwise, or after step 286, (mode 3 or 4) a frame counter is compared to zero at 288. If it is equal to zero, the frame is a secondary channel frame and control passes to 290 where the secondary channel procedures are carried out. The process returns to 282 at 292.

If the counter is not zero at 288, control passes to 294 where the counter is inspected to see if it has reached 48. If so, zero is loaded into the counter at 296. If not, the counter is incremented at 298. In either case, the process then goes to 300 where the primary channel procedures are carried out. The process then returns to 282 at 302.

Figure 16:
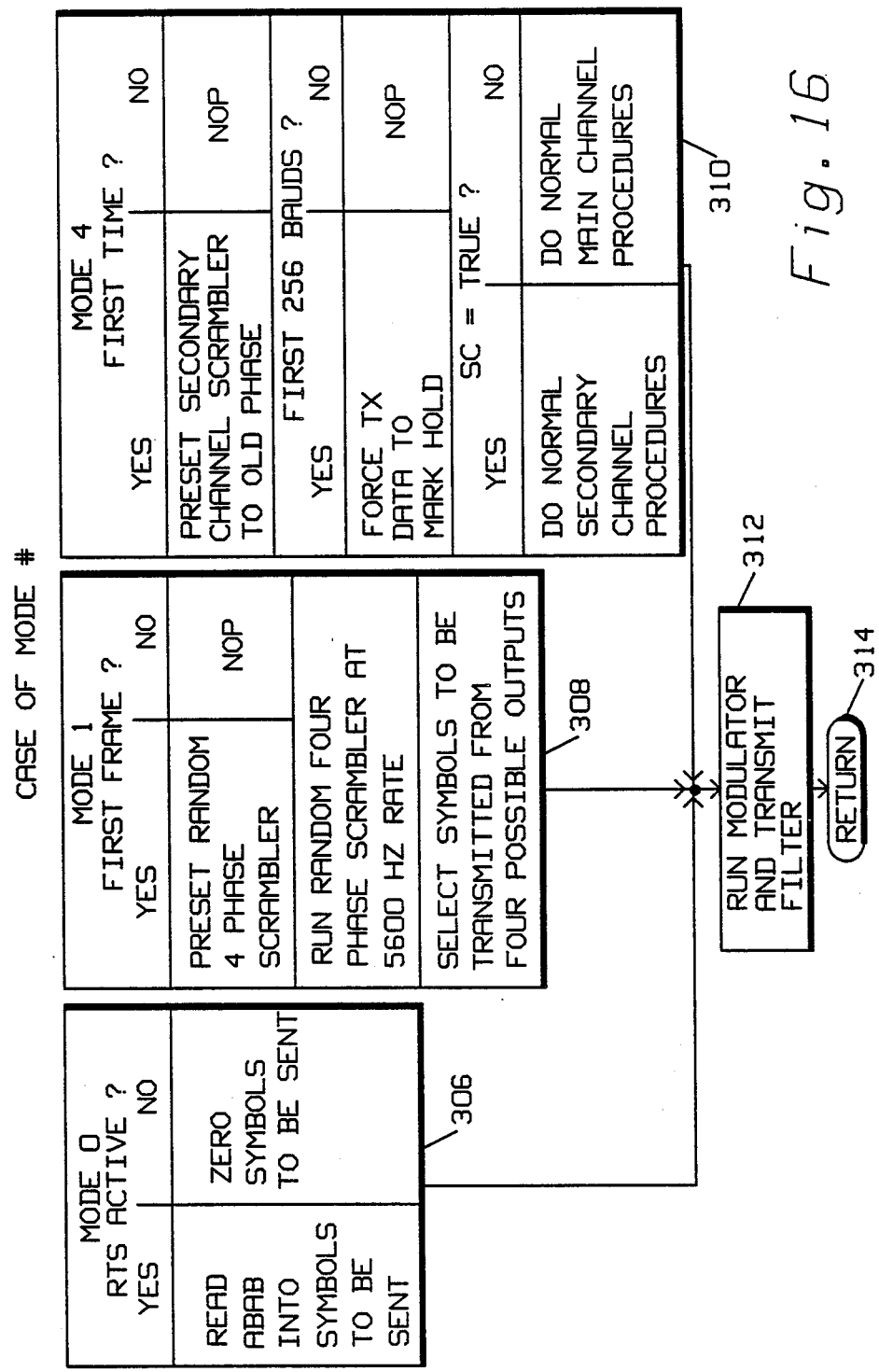
FIG. 16 is a flow chart of the transmitter of the present invention.

The operation of the transmitter of FIG. 1 is described by the flow chart of FIG. 16 which begins with a determination of the case of the mode. The modes are defined as follows:

Mode 0 corresponds to the clocks and carriers segment of the training sequence. During this period two vectors are sent in on alternating symbol pattern (ABAB ... ), for 256 bauds.

Mode 1 corresponds to the equalizer conditioning segment of the training sequence. At the beginning of this segment the scrambler is preset to a value known to the receiver. This scrambler is run at twice the baud rate for a period of 8400 bauds.

Mode 2—corresponds to a preset for the secondary channel scrambler.

Mode 3—forces mark hold into customer data.

Mode 2 and mode 3 combined with mode 4 corresponds to the Viterbi synchronization period. During the first frame of this period the initialization for the secondary channel scrambler takes place and the first secondary channel frame is sent. Also the counter that keeps track of primary and secondary channel frames is started. Main channel data is forced to mark hold and the main channel differential and convolutional encoders are started for the first time. This period of the training sequence last for 256 bauds.

Mode 4 corresponds to the steady state. Differential and convolutional encoders for the main channel are being used. Customer data is enabled. Constellation division multiplexing between main channel and secondary channel is enabled.

In case of mode 0 in FIG. 16, block 306 is entered where an ABAB pattern is sent if RTS is active; otherwise zeros are sent (squelch). In case of Mode 1, block 308 is entered. On the first frame the random four phase scrambler is preset. After this, the scrambler is operated at 5600 Hz and one of four possible symbols is selected for transmission. In case of mode 4, the secondary channel scrambler is preset the first time. During the first 256 bauds TX data is forced to mark hold pattern and then normal main or secondary channel operation takes place depending on the value of SC from the timer generator 140 of FIG. 2. After 306, 308 or 310, the modulator and filters 312 after which the process returns at 314 to the case decision.

Figure 17:
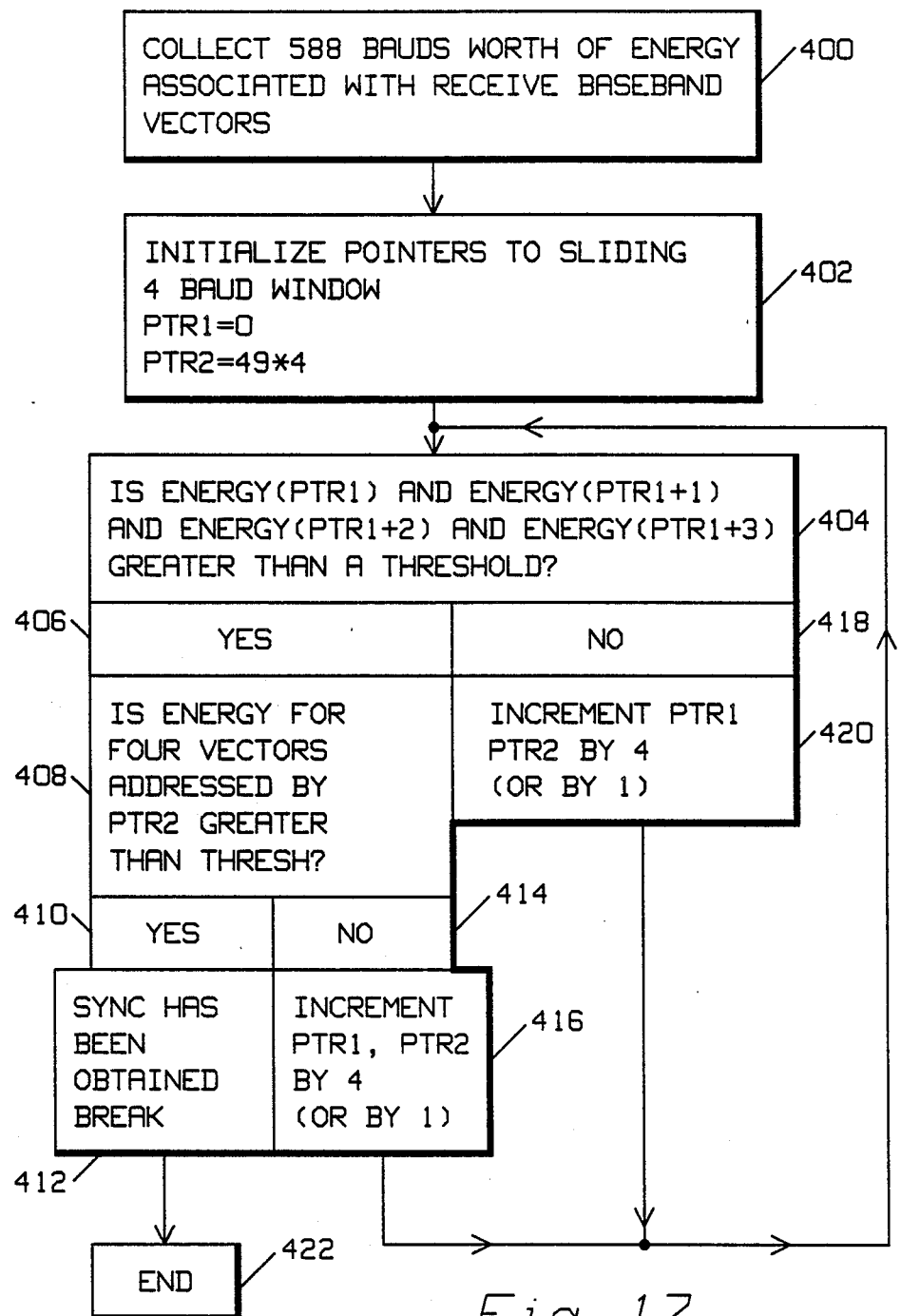
FIG. 17 is a flow diagram of the synchronization process of the present invention.

The secondary channel may be used for regaining synchronization during brief dropouts by detection of the increase in average energy present in the four bauds of data in the secondary channel. One process for exploiting this is shown in FIG. 17. In this process 588 bauds of data are collected in memory at step 400. At step 402 a set of pointers are initialized to create a sliding 4 baud window. The energy in the four consecutive bauds of energy is compared with a threshold at 404. If the energy of each of the four bauds is greater than the threshold at 406, the energy of the four vectors 49 frames away is also checked against the threshold. If they are also greater than the threshold at 410, synchronization is deemed to have been obtained at 412. If not at 414, the pointers are incremented by four is one embodiment or by one in another embodiment at 416 and control passes to 404 where the next window is inspected. If at 418 the energy of four consecutive symbols did not exceed the threshold, the two pointers are incremented by 4 in one embodiment or 1 in another embodiment and the next set of four symbols are inspected for high energy. The process ends at 422 when synchronization has been obtained.

The scheme is based on the fact that the two channels have a different average energy, so a sliding window 4 bauds wide (in the preferred embodiment) is used to compute the energy of the received vectors and then the difference of energy of the vectors and the expected ideal energy for the secondary channel is computed. If the differences are lower than a threshold, based on the actual average energies of main and secondary channel, then a partial synchronization is assumed and 49 frames are skipped, and again a verification of the difference in energies is performed. If the difference is less than the threshold, then the synchronization has been achieved and the modem returns to the steady state program. If the difference is greater than the threshold, each successive frame or group of four symbols is inspected until one is found that meets the criteria. The modem then skips 49 frames and rechecks until the synchronization is achieved.

The detection scheme can store the energy of 588 consecutive bauds (corresponding to three 49 frame time periods) in common RAM and the skip is then accomplished by changing a pointer to the next 4 baud window or next group of four symbols. By looking through this new 4 baud window at 196 baud intervals the secondary channel 4 baud frame can be distinguished from the main channel. Using this technique for a 19.2 kbps system, the synchronization can be achieved within approximately 210 ms. The present scheme offers the advantage that it does not require redundant bits to establish the synchronization at the receiver, since the difference in expected energy is used for the detection process.

Detection of the secondary channel can be further enhanced by slicing the signal so as to not merely distinguish it from other secondary channel symbols, but also from main channel symbols as well. In other words, rather than using an absolute energy level as comparison, the received symbols can be inspected to see if they fall within a range about an ideal secondary symbol point. If so, it is considered to be a secondary channel symbol. This technique, in addition to providing a comparison of energy level, provides a check to see that adjacent symbols are modulo 90° degrees apart (for a four symbol constellation of the present invention). The slicing can be done in a number of ways to provide this benefit. For example, the slicing can define a square area in the constellation having minimum and maximum allowable real and imaginary values in order to be deemed a secondary channel symbol, or the received symbol can be compared with an ideal received symbol and must fall within a fixed or variable radius or real and imaginary distance about the ideal symbol in order to be deemed a secondary channel symbol. In another embodiment, the four symbols group that has the highest average energy and in which all the symbols are modulo 90° from each other is detected as the secondary frame. Those skilled in the art will see many variations in this technique which fall within the present invention.

In the preferred embodiment this invention is implemented in firmware using a digital signal processor such as the Texas Instruments TMS32020 processor, but this scheme is implementable in any other type of digital signal processor. The master frame used is 49*4 bauds long (one baud is 2800 hz in the present case), the first 4 baud subframe within this frame correspond to the secondary channel with vectors that have an average energy that is greater than the average energy of the main channel. The remaining 48*4 bauds correspond to main channel and they have a lower expected average energy. The synchronization scheme consists in a sliding window that looks at one 4 baud frame at a time for the expected secondary channel energy and once it finds a close match, it verifies by checking the corresponding subframe that comes in the next master frame. If a good match is found for the energies in that frame, then synchronization has likely been achieved for the receiver, else the sliding window is moved one baud at a time until synchronization is achieved. Since the multiport option in many multidimensional encoded high speed modems requires an 8 baud format (for a minimum port speed of 2400 bps) or a 16 baud format (for a minimum port speed of 1200 bps), by properly establishing the order of the multiport subframes within the master frame, a multiport resynchronization may also be achieved after a dropout.

In the multiport environment, the master frame is divided up so that one or more frames (or symbols) are allocated to one port. If each master frame is identical in its allocation of frames, master frame synchronization alone is adequate to establish that no port swapping will occur if synchronization is lost at at dropout and then regained. Since main channels may be allocated in increments of 400 Bps without subdividing frames, multiport synchronization need not differ from single port synchronization in most instances.

The modem in which the present invention is implemented is a microprocessor based modem. As will be appreciated by those in the art, the microprocessor-based modem control and data processing circuits also typically include the usual data storage elements (e.g., ROM for program control storage and the like, and RAM for variable input/output/intermediate result data, etc.) conventionally associated signals in accordance with a stored program. In the presently preferred exemplary embodiment, these already present microprocessor CPU, ROM and RAM elements are also utilized to perform the functions of the present invention. With the present invention, the modem functions are preferably implemented in high speed digital signal processors such as Texas Instrument's TMS 32020 processors. With respect to FIG. 1, all of the transmitter modem functions therein are preferably, but not necessarily, performed by the digital signal processor. As is well-known, after filtering in block 130, a D/A converter and antialiasing filters (not shown) are used. With respect to FIG. 10, all of the receiver modem functions of FIG. 10 are preferably, but not necessarily, performed by the digital signal processor.

Thus it is apparent that in accordance with the present invention, a method that fully satisfies the aims, advantages and objectives is set forth above. While the invention has been described in conjunction specific embodiments, it is evident that many alternatives, modifications and variations will become apparent to those skilled in the art upon consideration of the foregoing description. Accordingly, it is intended that the present invention embrace all such alternatives, modifications and variations as fall within the spirit and broad scope of the appended claims.

What is claimed is:

1. A method for providing a main channel and a secondary channel in a data modem, the method comprising the steps of:
   receiving data to be transmitted over a main channel;
   receiving data to be transmitted over a secondary channel;
   generating main channel symbols from a first constellation corresponding to said main channel data;
   generating secondary channel symbols from a second constellation corresponding to said secondary channel data; and
   alternating transmission of said main channel symbols during a first predetermined time period with transmission of said secondary channel symbols during a second predetermined time period so that said main channel symbols from said first constellation and said secondary channel symbols from said second constellation are interleaved in time.

2. The method of claim 1, further including the step of encoding said main channel data using a redundancy generating encoding method.

3. The method of claim 2, wherein said redundancy generating encoding method includes convolutional encoding of said main channel data.

4. The method of claim 1, wherein said secondary channel data is modulated using a differential phase shift keying modulation method.

5. The method of claim 1, wherein symbols from said second constellation have a higher average energy than symbols from said first constellation.

6. The method of claim 1, wherein said main and secondary channel symbols are arranged in a master frame of 49 frames, with each frame including 4 symbols of primary or secondary channel data; and wherein said master frame comprises 1 frame of secondary channel symbols and 48 frames of main channel symbols.

7. The method of claim 1, wherein said secondary channel has a higher average signal to noise ratio than said main channel.

8. The method of claim 1, wherein said first constellation has a greater number of points than said second constellation.

9. The method of claim 8, wherein said first constellation has 160 points and said second constellation has 4 points.

10. The method of claim 5, wherein said first constellation has a greater number of points than said second constellation.

11. A method of receiving main and secondary channel data in a synchronous data modem, the method comprising the steps of:
    receiving a plurality of synchronously transmitted constellation symbols;
    determining which of said plurality of constellation symbols are main channel symbols selected from a main channel constellation and which of said data symbols are secondary channel symbols selected from a secondary channel constellation, said secondary channel symbols and said main channel symbols being interleaved in time at periodic intervals so that said main channel symbols and said secondary channel symbols each carry synchronous data with the secondary channel data having a data rate which is a predetermined proportion of the data rate of said main channel data;
    processing said main channel constellation symbols according to a method for extracting data from said main channel constellation symbols; and
    processing said secondary channel constellation symbols according to a method for extracting data from said secondary channel constellation symbols.

12. The method of claim 11, wherein said method for processing said main channel constellation symbols includes a Viterbi decoding method for making soft decisions.

13. The method of claim 11, wherein said method for processing said secondary channel constellation symbols includes a differential decoding method.

14. The method of claim 11, wherein said constellation symbols of said secondary channel constellation have higher average energy than constellation symbols of said main channel constellation.

15. The method of claim 11, further comprising the step of adapting an adaptive equalizer during receipt of said secondary channel constellation symbols.

16. The method of claim 11, further comprising the step of adjusting the frequency of a carrier generator during receipt of said secondary channel constellation symbols.

17. The method of claim 11, further comprising the steps of:
    adapting an adaptive equalizer;
    monitoring the signal quality of received main channel constellation symbols;
    comparing said signal quality of received main channel constellation symbols with a predetermined threshold of acceptable signal quality;
    inhibiting adapting of said adaptive equalizer during receipt of main channel constellation symbols and continuing adapting of said adaptive equalizer during receipt of secondary channel constellation symbols if said signal quality is below said predetermined threshold.

18. The method of claim 11, further comprising the steps of:
    adjusting the carrier frequency of a carrier generator;
    monitoring the signal quality of received main channel constellation symbols;

comparing said signal quality of received main channel constellation symbols to a predetermined threshold of acceptable signal quality;

inhibiting adjusting of said carrier frequency during receipt of main channel constellation symbols and continuing adjusting of said carrier frequency during receipt of secondary channel constellation symbols if said signal quality is below said predetermined threshold.

19. A method for providing synchronization in a data modem, comprising the steps of:
receiving a segment of data having length equal to that of a master frame having predetermined length, said master frame including a designated time period for transmitting secondary channel symbols from a secondary channel constellation;
searching said segment for a first time period containing secondary channel symbols; and
synchronizing said data modem receiver by setting said designated time period equal to said first time period.

20. The method of claim 19, further comprising the step of:
after said searching step, verifying that said designated time period has been located by inspecting a successive segment for secondary channel symbols.

21. The method of claim 19, wherein said searching step includes passing a sliding window across said segment of data and determining the average energy of the symbols within said sliding window, wherein symbols having distinctive energy characteristics are secondary channel symbols.

22. The method of claim 21, wherein said master frame comprises 49 frames of data, each frame comprising 4 symbols and wherein said designated time period and said first time period each being equal to the duration of one frame.

23. An apparatus, comprising:
main channel mapping means for generating symbols from a main channel constellation corresponding to main channel data;
secondary channel mapping means for generating symbols from a secondary channel constellation corresponding to secondary channel data;
selecting means for alternately selecting main channel and secondary channel symbols in a predetermined arrangement for transmission over a data channel; and
transmitting means for transmitting said selected symbols.

24. The apparatus of claim 23, wherein said main channel mapping means further comprises means for convolutionally encoding said main channel data.

25. The apparatus of claim 23, wherein said main channel mapping means further comprises means for differentially encoding said main channel data.

26. The apparatus of claim 24, wherein said main channel mapping means further comprises means for differentially encoding said main channel data.

27. The apparatus of claim 23, wherein said secondary channel mapping means further comprises means for differentially encoding said secondary channel data.

28. The apparatus of claim 23, wherein said main channel constellation contains more symbols than said secondary channel constellation.

29. The apparatus of claim 28, wherein said main channel constellation contains approximately 160 points and said secondary channel constellation contains approximately 4 points.

30. The apparatus of claim 23, wherein said secondary channel constellation has a higher average energy than said main channel constellation.

31. The apparatus of claim 23, further comprising:
symbol receiving means for receiving main channel and secondary channel symbols;
separating means for separating main channel symbols taken from said first constellation from secondary channel symbols taken from said second constellation;
main channel decoding means for translating said main channel symbols to main channel data; and
secondary channel decoding means for translating said secondary channel symbols to secondary channel data.

32. The apparatus of claim 31, wherein said secondary channel constellation has a higher average energy than said main channel constellation.

33. The apparatus of claim 32, further comprising synchronization means for detecting said higher average energy with relative phase characteristics indicative of secondary channel symbols and for synchronizing said separating means so that said separating means properly separates said main channel symbols from said secondary channel symbols.

34. An apparatus for receiving main channel and secondary channel data in a data modem, comprising:
symbol receiving means for receiving main channel and secondary channel symbols;
separating means for separating main channel symbols taken from a first constellation from secondary channel symbols taken from a second constellation, said main channel symbols and said secondary channel symbols being periodically interleaved in time;
main channel decoding means for translating said main channel symbols to main channel data; and
secondary channel decoding means for translating said secondary channel symbols to secondary channel data.

35. The apparatus claim 34, wherein said secondary channel constellation has a higher average energy than said main channel constellation.

36. The apparatus of claim 35, further comprising synchronization means for detecting said higher average energy and for synchronizing said separating means so that said separating means properly separates said main channel symbols from said secondary channel symbols.

37. The apparatus of claim 34, wherein said main channel decoding means further comprises a Viterbi decoder.

38. The apparatus of claim 34, wherein said main channel decoding means further comprises a differential decoder.

39. The apparatus of claim 37, wherein said main channel decoding means further comprises a differential decoder.

40. The apparatus of claim 34, wherein said secondary channel decoding means further comprises a differential decoder.

41. The apparatus of claim 34, wherein said symbol receiving means further comprises an adaptive equalizer.

42. The apparatus of claim 41, further comprising means for monitoring received signal quality and means for adapting said adaptive equalizer only during periods of receipt of secondary channel symbols when said received signal quality is judged to be poor.

43. The apparatus of claim 34, wherein said symbol receiving means includes a demodulator for converting said received symbols to baseband, and a carrier generator for generating a carrier signal having frequency for use by said demodulator; and further comprising means for adaptively adjusting said carrier generator's frequency.

44. The apparatus of claim 43, further comprising:
signal quality monitoring means for monitoring received signal quality and for permitting adaption of said carrier generator's frequency only during periods of receipt of secondary channel symbols when said received signal quality is judged to be poor.

45. An apparatus for adjusting a characteristic of a data modem having a secondary channel and a main channel, said secondary channel being more immune to noise and other line disturbances than said main channel, said main and secondary channels being transmitted during main and secondary time intervals respectively, the apparatus comprising in combination;
receiving means for receiving signals carrying said main and secondary channel;
timing means for determining when said main and seconary channels respectively are being received;
monitoring means for monitoring the quality of said received signals; and
adjusting means, coupled to said monitoring means, for adjusting said characteristic of said receiving means while receiving either main or secondary channel when said signal quality is good and for adjusting said characteristic only during the time interval of receipt of said secondary channel when said signal quality is poor.

46. The apparatus of claim 45, wherein said monitoring means includes means for monitoring an indication of mean-square error computed by a Viterbi decoder.

47. The apparatus of claim 46, wherein said adjusting means includes means for receiving said mean-square error and comparing said mean-square error to a threshold, and wherein signal quality is judged poor if said mean-square error is greater than said threshold and good if said mean-square error is smaller than said threshold.

48. The apparatus of claim 45, wherein said receiving means further comprises an adaptive equalizer having tap values and wherein said adjusting means adjusts the tap values of said adaptive equalizer.

49. The apparatus of claim 45, wherein said receiving means further comprises a demodulator for demodulating incoming signals to baseband, and a carrier generator coupled to said demodulator, and wherein said adjusting means adjusts the frequency of said carrier generator.

50. An apparatus for synchronizing a modem receiver to a modem transmitter, comprising in combination:
receiving means for receiving one or more segments of data having length equal to that a master frame including a designated time period for transmitting secondary channel constellation symbols from a secondary channel constellation;
searching means for searching said segment for a first time period containing a group of symbols separated by a predetermined phase characteristic and having average energy within a predetermined range; and
synchronizing means for synchronizing said data modem receiver by setting said designated time period equal to said first time period.

51. The apparatus of claim 50, further comprising:
verifying means for verifying that said designated time period has been located by inspecting a successive segment for average energy within said predetermined range and symbol separation of 0°, 90°, 180° or 270° between successive symbols in said first time period.

52. The apparatus of claim 50, wherein said searching means includes means for passing a sliding window across said segment of data and means for determining the average energy of the symbols within said sliding window.

53. The apparatus of claim 50, wherein said master frame comprises 49 frames of data, each frame comprising 4 symbols and wherein said designated time period and said first time period each being equal to the duration of one frame.

54. A modulation-demodulation apparatus having a transmitter and a receiver comprising:
said transmitter including a first and second mapping means,
said first mapping means for grouping main-channel digital data into a plurality of main-channel bit groups and for selecting in response to each of said main-channel bit groups a main-channel complex-valued symbol from a main-channel symbol constellation having M complex-valued symbols so as to define a sequence of said selected main-channel symbols;
said second mapping means for grouping secondary channel digital data into a plurality of secondary-channel bit groups and for selecting in response to each of said secondary-channel bit groups a secondary-channel complex-valued symbol from a secondary-channel constellation having N complex-valued symbols so as to define a sequence of said selected secondary-channel symbols, where $M > N$;
said transmitter further including modulated carrier generating means for modulating a carrier signal by one of said selected symbols during each one of a plurality of symbol intervals;
said transmitter further including a first switching means for repeatedly alternating between providing at least one said selected main channel symbol during a main-channel time period having at least one of said symbol intervals and at least one said selected secondary-channel symbol during a secondary channel time period having at least one of said symbol intervals;

said receiver including symbol extracting means for receiving a modulated carrier signal having pairs of alternating carrier signal portions with one of said pair having been modulated by at least one received selected symbol from said main-channel symbol constellation of M complex-valued symbols and the other one of said pair having been modulated by at least one received selected symbol from said secondary channel symbol constellation of N complex-valued symbols, where M>N;

said symbol extracting means including a second switching means for switching to a main receiver channel to receive said carrier signal portions modulated by received selected symbols from said main channel constellation and to a secondary receiver channel to receive said carrier signal portions modulated by said received selected symbols from said secondary channel constellation, said receiver channels each having signal extracting components suitable for operating on said carrier signal portions switched to said each receiver channel to extract said at least one selected symbol.

55. The modulation-demodulation apparatus according to claim 54, wherein said transmitter further includes means for sending a synchronization signal indicative of the state of said first switching means, said receiver includes means for receiving a received synchronization signal and for using said received synchronization signal for synchronization of said second switching means with said carrier signal portions.

56. The modulation-demodulation apparatus according to claim 55, wherein said receiver further includes synchronization means for detecting loss of said synchronization of said second switch means with said carrier signal portions.

57. The modulation-demodulation apparatus according to claim 56, wherein said synchronization means further includes means for using detection of the occurrence of said carrier signals portions to reestablish said synchronization.

58. The modulation-demodulation apparatus according to claim 57, wherein said first mapping means includes a multidimensional convolutional encoder, said first mapping means is operable to provide frames of a plurality of said selected main-channel symbols with each of said frames defining a multidimensional symbol of greater than two dimensions, said carrier signal portion modulated by at least one of said received selected symbols from said main-channel constellation includes having been modulated by a plurality of said received selected symbols, said plurality of said received selected symbols including at least one received frame of said received selected symbols that define a multidimensional symbol of greater than two dimensions, said synchronization means being operable for using said detection of the occurrence of said carrier signal portions to ascertain beginnings of said frames.

59. A modulation-demodulation apparatus according to claim 58, wherein said first mapping means includes a multiplexer for time multiplexing a plurality of streams of data to form said main-channel digital data, said main-channel digital data defining a plurality of masterframes, said synchronization means being operable for using said detection of the occurrence of said carrier signal portions to ascertain beginnings of said masterframes.

60. A modulation-demodulation apparatus according to claim 56, wherein said synchronization means includes means for ascertaining and comparing detectable characteristics of a signal derived from a part of said modulated carrier signal occurring within each of a sequence of time intervals, each of said time intervals having a fixed duration of at least one of said symbol intervals, and being offset from a previous one of said time intervals by one of said symbol intervals.

61. The modulation-demodulation apparatus according to claim 54, wherein said first switch means repeatedly alternates between providing a plurality of said selected main-channel symbols during said main-channel time period having a first number of said synbol intervals and a plurality of said selected secondary-channel symbols during said secondary-channel time period of a second number of said symbol intervals, wherein said first number of said symbol intervals is greater than said second number of said symbol intervals.

62. The modulation-demodulation apparatus according to claim 61, wherein said plurality of said selected main-channel symbols during each said main-channel time period includes a plurality of frames of said selected main-channel symbols and said plurality of said selected secondary-channel symbols during each said secondary-channel time period includes a single frame of said selected secondary-channel symbols, the number of said selected main-channel symbols in each said frame thereof being equal to the number of said selected secondary-channel symbols in each said frame thereof.

63. The modulation-demodulation apparatus according to claim 62, further including synchronization means for detecting loss of synchronization and for reestablishing synchronization, said synchronization means including means for ascertaining and comparing detectable characteristics of signals derived from said modulated carrier signal occurring within each of a sequence of time intervals, each of said time intervals having a duration equal to that of said frames and being offset from the previous one of said time intervals of said sequence by one of said symbol intervals.

64. The modulation-demodulation apparatus according to claim 63, wherein said detectable charcteristics of said signals comprise average energy levels.

65. The modulation-demodulation apparatus according to claim 54, wherein said signal extracting components for each said receiver channel include a demodulator means for demodulating its respective said carrier signal portions to produce a demodulated signal.

66. The modulation-demodulation apparatus according to claim 65, wherein said signal extracting components for each said receiver channel further include an adaptive equalizer means for producing an equalized signal.

67. The modulation-demodulation apparatus according to claim 65, wherein said demodulator means for said secondary channel updates carrier phase determinations for said main channel when line conditions exceed a threshold level of acceptability and does not use said carrier phase determinations of said main channel when the line conditions do not exceed a threshold level of acceptability.

68. The modulation-demodulation apparatus according to claim 66, wherein said equalizer means updates a plurality of tap coefficient settings when line conditions exceed a threshold level of acceptability and does not update said tap coefficient settings during receipt of main channel data when said line conditions do not exceed said threshold level.

69. A modulation-demodulation apparatus having a transmitter and a receiver, comprising:

a plurality of mapping means, each being operable to receive one of a plurality of sequences of binary data;

each of said mapping means being operable for grouping said binary data allocated to said mapping means into a plurality of bit groups and for selecting in response to each said bit group a complex-valued symbol from a symbol constellation having a number of complex-valued symbols, said number being dependent upon a particular said mapping means;

at least one of said constellations of one of said mapping means having a different said number of said complex-valued symbols than said number of said complex-valued symbols for one of the other said constellation of one of the other said mapping means;

said transmitter further including modulated carrier generating means for modulationg a carrier signal by one of said selected symbols during each one of a plurality of symbol intervals;

said transmitter further including a first switching means for sequentially providing during each one of a plurality of repetitive time cycles at least one said selected symbol from each of said mapping means to said modulated carrier generating means;

said receiver including symbol extracting means for receiving a modulated carrier signal transmitted over a transmission medium, said modulated carrier signal having a repetitive cycle of a plurality of carrier signal portions with each of said carrier signal portions having modulated therein at least one selected symbol from one of a plurality of constellations of complex-valued symbols; and said symbol extracting means including a second switching means for switching between a plurality of receiver channels in response to said carrier signal portions, each of said receiver channels having signal extracting components suitable for operating on said carrier signal portions switched to said each receiver channel to extract said at least one selected symbol.

* * * * *